United States Patent [19]

Migishima

[11] Patent Number: 5,742,744
[45] Date of Patent: Apr. 21, 1998

[54] OUTPUT APPARATUS AND METHOD FOR ESTABLISHING A USING RIGHT FOR PLURAL DATA PROCESSING UNITS

[75] Inventor: Isao Migishima, Yokohama, Japan

[73] Assignee: Canon Kabushiki Kaisha

[21] Appl. No.: 804,755

[22] Filed: Feb. 24, 1997

Related U.S. Application Data

[63] Continuation of Ser. No. 260,962, Jun. 15, 1994, abandoned.

[30] Foreign Application Priority Data

Jun. 17, 1993 [JP] Japan .................................. 5-169839

[51] Int. Cl.$^6$ ........................................................ G06F 13/00
[52] U.S. Cl. .................... 395/110; 395/104; 395/778; 395/800.01; 395/821; 395/805; 364/DIG. 1
[58] Field of Search .................... 395/778, 800.01, 395/821, 805, 104, 110; 364/DIG. 1

[56] References Cited

U.S. PATENT DOCUMENTS

| 4,901,249 | 2/1990 | Shiota | 364/519 |
|---|---|---|---|
| 5,220,674 | 6/1993 | Morgan et al. | 395/800 |
| 5,402,527 | 3/1995 | Bigby et al. | 395/101 |

FOREIGN PATENT DOCUMENTS

| 0119395 | 9/1984 | European Pat. Off. . |
|---|---|---|
| 0304071 | 2/1989 | European Pat. Off. . |
| 0478339 | 4/1992 | European Pat. Off. . |
| 0480399 | 4/1992 | European Pat. Off. . |
| 63-040971 | 2/1988 | Japan . |
| 03-011471 | 1/1991 | Japan . |
| 04-147312 | 5/1992 | Japan . |

OTHER PUBLICATIONS

Computer Dictionary 2nd Ed., Microsoft Press, 1994 p. 287.

*Primary Examiner*—Alpesh M. Shah
*Assistant Examiner*—Dzung C. Nguyen
*Attorney, Agent, or Firm*—Fitzpatrick, Cella, Harper & Scinto

[57] ABSTRACT

An output apparatus and method controls a combination of a plurality of font data stores and a plurality of conversion methods for converting font data to dot pattern data in accordance with a condition of a using right of a print data processing unit and a bit map pattern producing unit.

13 Claims, 27 Drawing Sheets

FIG.2

| | | |
|---|---|---|
| USING RIGHT NUMBER OF PROCESSING UNIT 109 | 0010 | ~201 |
| | 0020 | ~202 |
| USING RIGHT NUMBER OF PROCESSING UNIT 110 | 0020 | ~203 |
| USING RIGHT NUMBER OF PRODUCING UNIT 112 | 0010 | ~204 |
| USING RIGHT NUMBER OF PRODUCING UNIT 114 | 0020 | ~205 |

THE SIGN OF USING RIGHT
OF PROCESSING UNIT 109  201A

THE SIGN OF USING RIGHT
OF PROCESSING UNIT 110  202A

THE SIGN OF USING RIGHT
OF PROCESSING UNIT 112  203A

THE SIGN OF USING RIGHT
OF PROCESSING UNIT 114  204A

LOGICAL MULTIPLICATION
OF SIGN OF 201A AND 203A  205A

LOGICAL MULTIPLICATION
OF SIGN OF 201A AND 204A  206A

LOGICAL MULTIPLICATION
OF SIGN OF 202A AND 203A  207A

LOGICAL MULTIPLICATION
OF SIGN OF 202A AND 204A  208A

FIG.17

| | | |
|---|---|---|
| THE SIGN OF USING RIGHT OF PROCESSING UNIT 109 | 0001 | ~201B |
| THE SIGN OF USING RIGHT OF PROCESSING UNIT 110 | 0010 | ~202B |
| THE SIGN OF USING RIGHT OF PRODUCING UNIT 112 | 0001 | ~203B |
| THE SIGN OF USING RIGHT OF PRODUCING UNIT 114 | 0100 | ~204B |
| LOGICAL MULTIPLICATION OF SIGN OF 201B AND 203B | 0001 | ~205B |
| LOGICAL MULTIPLICATION OF SIGN OF 201B AND 204B | 0000 | ~206B |
| LOGICAL MULTIPLICATION OF SIGN OF 202B AND 203B | 0000 | ~207B |
| LOGICAL MULTIPLICATION OF SIGN OF 202B AND 204B | 0000 | ~208B |

FIG.24

| CHARACTER SET | STROKE WEIGHT | STYLE ATTRIBUTE | CHARACTER SET NAME |
|---|---|---|---|
| CHARACTER SET 1 | REGULAR | UPRIGHT | CourierRegularUpright |
| CHARACTER SET 2 | BOLD | UPRIGHT | CourierBolduUpright |

FIG.25

CourierBoldItalic —911

FIG.26

BOLD —921

ITALIC —922

OUTPUT APPARATUS AND METHOD FOR ESTABLISHING A USING RIGHT FOR PLURAL DATA PROCESSING UNITS

This application is a continuation of application Ser. No. 08/260,962, filed Jun. 15, 1994, now abandoned.

BACKGROUND OF THE INVENTION

1. Field of the Invention

The present invention relates to an output apparatus and method for controlling combinations of print data processing units and bit map pattern producing units.

2. Related Background Art

Recently, some printing devices have been developed which have a plurality of processing units for processing print data and a plurality of producing units for producing bit map patterns from a plurality of font data. In these devices, all processing units for processing print data can use all producing units for producing bit map patterns because all processing units can refer to all font data.

Some printing devices have been developed which can select one of a plurality of character sets and which select the character set which corresponds to a name of the character set indicated by input data. However, if no character set corresponds to the name of the character set indicated by the input data, the device cannot change from one character set to another.

In these devices, it is difficult to control a combination of a specific producing unit for producing bit map patterns and a specific processing unit for processing print data. Accordingly, it is necessary to ensure compatibility or access between certain units, i.e. a right to use (using right) all producing units for producing bit map patterns by all processing units for processing print data.

Furthermore, it is difficult to use a specific producing unit with a specific processing unit. Namely, it is difficult to change an environment of processing print data, such as changing partly the processing unit and changing partly the producing unit.

Furthermore, in these devices, the selection is executed only in the case where the character set to be used corresponds to the name of the indicated character set.

Accordingly, even if a user wants to emphasize some characters, it is difficult to achieve the goal. Namely, if there is no character set which corresponds to the name of the indicated character set, the selection of a character set is not executed even if there is a character set which has similar attributes or characteristics.

SUMMARY OF THE INVENTION

The present invention has been made in consideration of the above situation, and has as one of its objects, to provide an output method and apparatus capable of establishing a print environment which uses a specific print data processing unit and a specific bit map pattern producing unit.

Another object of the present invention is to provide an output method and apparatus capable of determining using rights between a print data processing unit and a bit map pattern producing unit.

Another object of the present invention is to provide an output method and apparatus capable of understanding a condition of set using rights in accordance with the result of the logical multiplication.

Yet another object of the present invention is to provide an output method and apparatus capable of determining a condition of set using rights in accordance with the result of a logical multiplication of each using right sign and a comparison of each using right number.

Still another object of the present invention is to provide an output method and apparatus capable of selecting a character set in accordance with a priority order of attributes of characteristics of each character set.

According to one aspect of the present invention, an output apparatus includes a plurality of processors for processing inputted data, a converter for converting font data to bit map data, and determining device for determining a using right of the converter for use with each processor in order to convert the inputted data to bit map data.

According to another aspect of the present invention, an output method includes the steps of processing inputted data in a plurality of processing steps, converting font data to bit map data, and determining a using right of the converting step corresponding to each of the processing steps in order to convert the inputted data to bit map data.

According to yet another aspect of the present invention, an output apparatus includes a memory for storing a plurality of character sets, and a searching device for searching for a character set in accordance with a designated name of a character set, wherein the searching devices searches for a character set corresponding to the designated name by using prioritized attributes or characteristics.

According to still another aspect of the present invention, an output method includes the steps of storing a plurality of character sets in a memory, designating a name of a character set, and searching for a character set corresponding to the designated name in accordance with an attribute or characteristic which is related to the designated name.

These and other objects and features of the present invention will be apparent in the following description of the invention.

BRIEF DESCRIPTION OF THE DRAWINGS

FIG. 2 is a diagram showing a relationship of using right numbers between each print data processing unit and each bit map pattern processing unit.

FIG. 17 is a diagram showing a relation of using right numbers between each print data processing unit and each bit map pattern processing unit shown in FIG. 15.

FIG. 24 is a diagram illustrating a data structure of the character set memory in FIG. 23.

FIG. 25 is a diagram illustrating one example of a name of a character set which is designated by the host computer in FIG. 23.

FIG. 26 is a diagram of one example of a conversion result in the data base unit of character set in FIG. 23.

DETAILED DESCRIPTION OF THE PREFERRED EMBODIMENTS

The preferred embodiments according to the present invention will be described with reference to the accompanying drawings.

Figure 28:
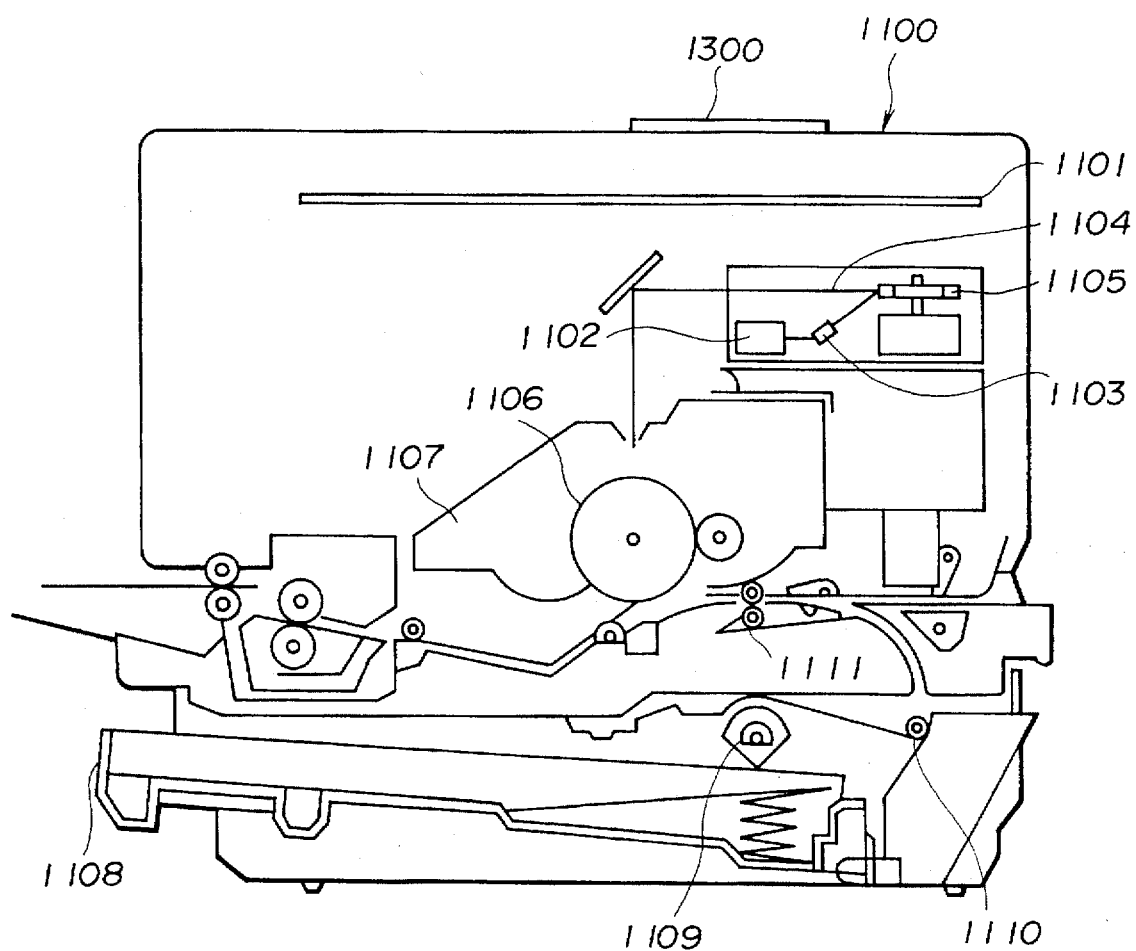
FIG. 28 is a cross-sectional view of a laser beam printer for use in the present invention.

FIG. 28 is a cross-sectional view of a recording apparatus, such as a laser beam printer, to which the character processing method of the present invention is applicable.

A main body of the apparatus 1100 (printer) receives and stores print information (character codes, etc.), font information and macro instructions supplied from an external host computer, generates character patterns (to be generated by the character pattern process of the present invention), forms patterns, and forms an image on a recording sheet serving as a recording medium. There are also shown an operation panel 1300, including switches and LED indicators for various operations, and a printer control unit 1101 for controlling the entire printer 1100 and analyzing the character information supplied from the host computer. The printer control unit 1101 converts the character information into a video signal of corresponding character patterns for supply to a laser driver 1102, which drives a semiconductor laser 1103 and switches on and off the laser beam 1104 emitted from the semiconductor laser 1103 according to the input video signal. The laser beam 1104 is laterally deflected by a rotary polygonal mirror 1105 to scan an electrostatic drum 1106, thereby forming an electrostatic latent image of a character pattern thereon. The latent image is developed into a visible image by a developing unit 1107 positioned around the electrostatic drum 1106, and is transferred onto the recording sheet (a cut sheet stored in a cassette 1108 mounted on the main body of the printer 1100, and supplied therefrom by a feed roller 1109, and transport rollers 1110 and 1111 to the electrostatic drum 106).

The image processing apparatus described above exemplifies a laser beam printer. However, the present invention is not limited to this. The present invention is equally applied to an ink-jet printer, as described below.

Figure 29:
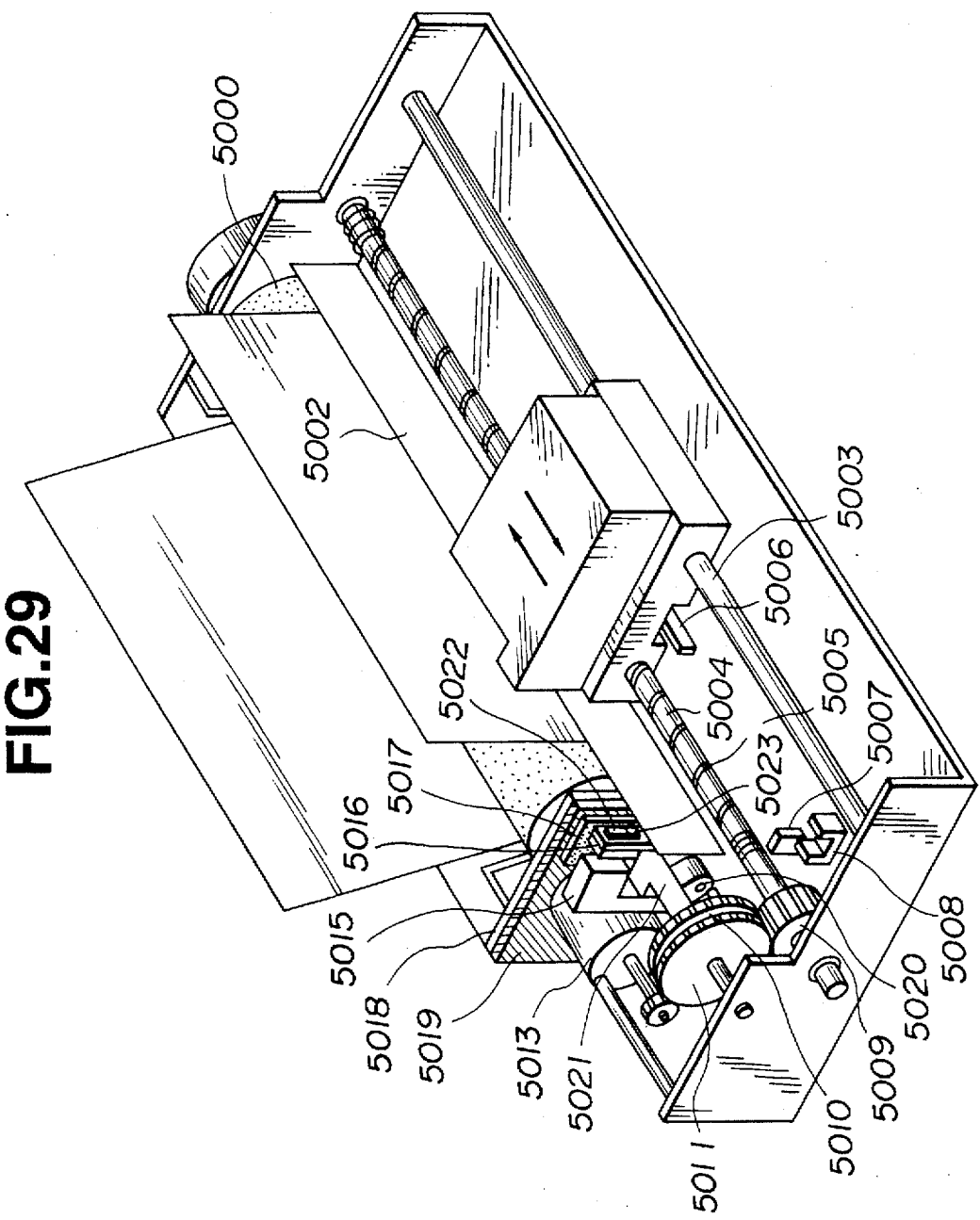
FIG. 29 is a cross-sectional view of an ink jet printing apparatus (IJRA) for use in the present invention.

FIG. 29 is a perspective view of an ink-jet recording apparatus IJRA to which the present invention can be applied. Referring to FIG. 29, a carriage HC engages a helical groove 5005 of a lead screw 5004 rotated interlockingly with forward/reverse rotation of a drive motor 5013 through driving force transmission gears 5011 and 5009 having a pin (not shown) and can be reciprocated in the directions indicated by arrows a and b. An ink-jet head cartridge IJH is mounted on the carriage HC. A paper press plate 5002 presses the paper against a platen 5000. A photocoupler 5007, 5008 comprises home position detecting means for detecting the presence of a lever 5006 of the carriage within a home position range in order to switch the rotational direction of the motor 5013. A member 5016 supports a cap member 5022 for capping the front surface of a recording head. A suction device 5015 draws the ink from the cap through an opening 5023 in the cap to recover the recording head. A cleaning blade 5017 is moved back and forth by a member 5019, and the cleaning blade 5017 and the member 5019 are supported on a main body support plate 5018. The blade need not have the form shown, but can instead have another known form. A lever 5021 starts suction to recover the recording head. The lever 5021 is moved together with a cam 5020 engaged with the carriage. The driving force from the motor 5013 is controlled by a known transmitting means such as a clutch switching device.

Capping, cleaning and suction recovery are performed by desired processes at the corresponding positions in accordance with the action of the lead screw 5004 when the carriage reaches the home position. If desired operations are performed at set timings, any scheme can be employed in this embodiment.

Figure 30:
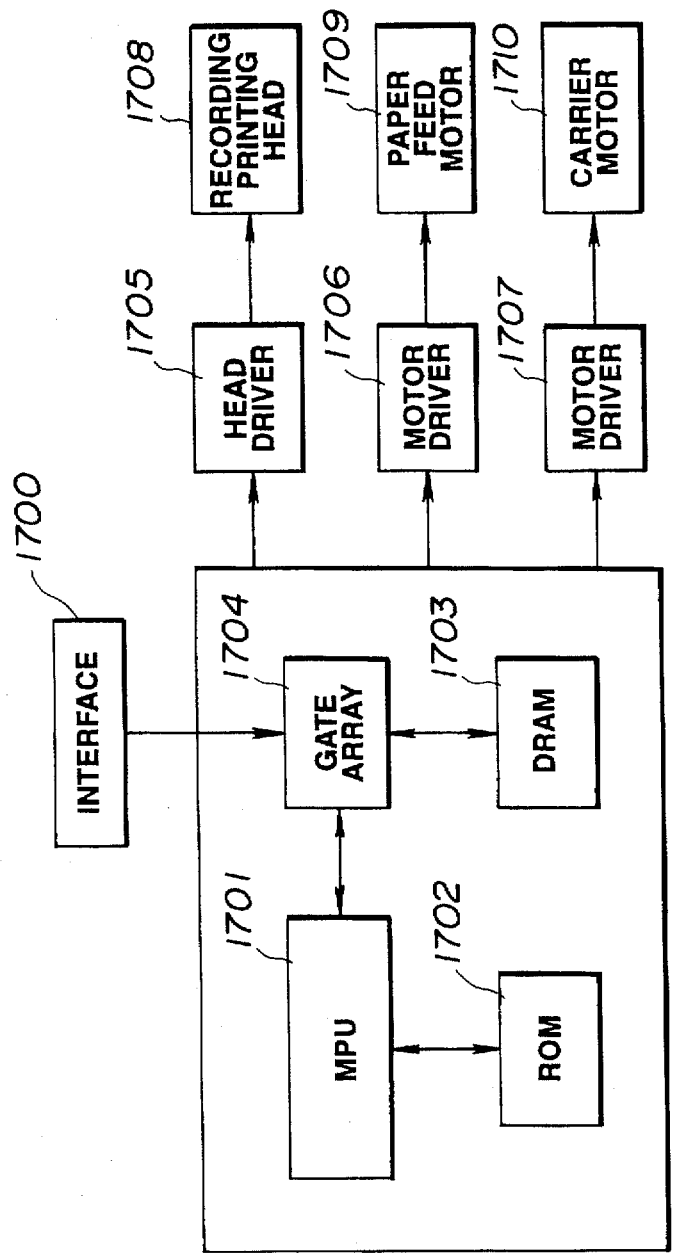
FIG. 30 is a schematic block diagram of a control unit for controlling the ink jet printing apparatus of FIG. 29.

A control arrangement for executing recording control of the respective components in the apparatus will be described with reference to the block diagram in FIG. 30. A control circuit includes an interface 1700 for inputting a recording signal, an MPU 1701, a program ROM 1702 for storing control programs executed by the MPU 1701, a dynamic RAM (DRAM) 1703 for storing various data (e.g., the recording signal and recording data supplied to the head), a gate array 1704 for controlling and supplying the recording data to recording head 1708 and performing transfer control of data between the interface 1700, the MPU 1701, and the DRAM 1703, a carriage motor 1710 for moving the recording head 1708, a paper feed motor 1709 for conveying recording sheets, a head driver 1705 for driving the head, and motor drivers 1706 and 1707 for driving the paper feed motor 1709 and the carriage motor 1710, respectively.

When a recording signal is input to the interface 1700, the recording signal is converted into print recording data by the gate array 1704 and the MPU 1701. The motor drivers 1706 and 1707 are actuated to drive their respective motors in accordance with driving of the recording head with the recording data supplied to the head driver 1705, thereby printing the recording information.

It is possible to incorporate the constituent components of the present invention in the control arrangement of the ink-jet printer.

First Embodiment

Figure 1:
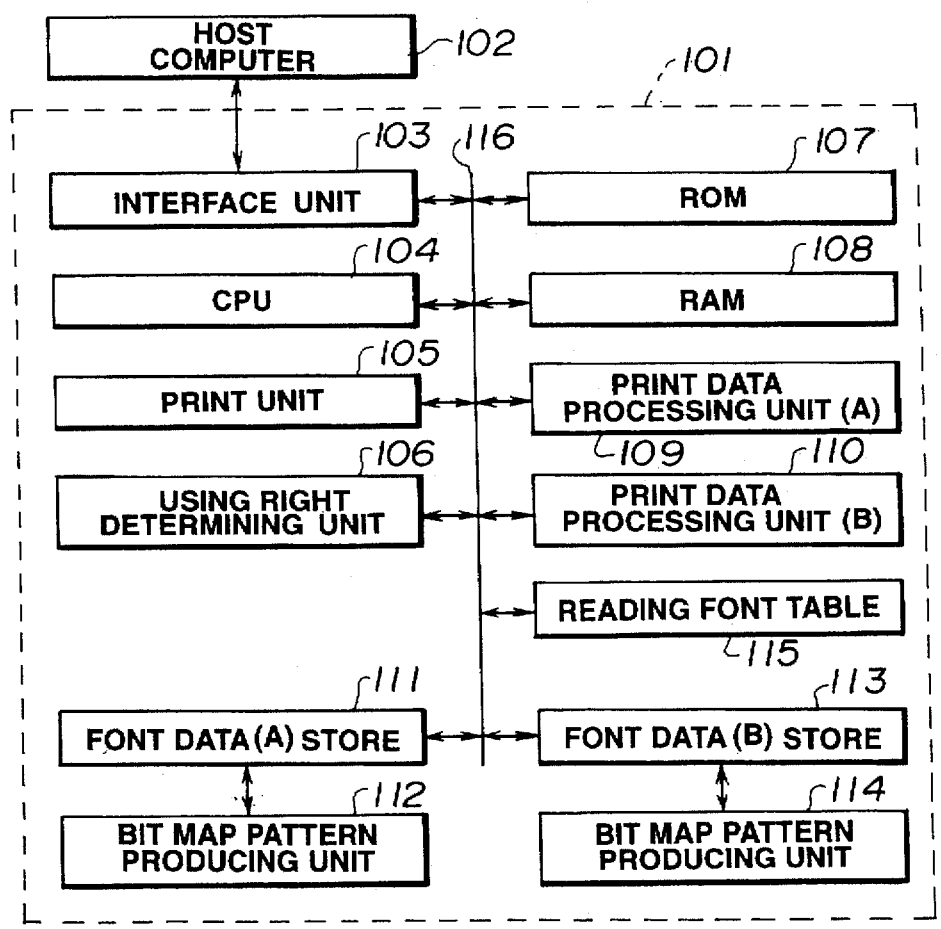
FIG. 1 is a block diagram showing a construction of a printing apparatus according to a first embodiment of the present invention.

FIG. 1 is a block diagram showing controlling construction of a printing apparatus according to a first embodiment of the present invention. In this embodiment, a plurality of print data processing units correspond to a plurality of producing units for use with a plurality of font data. In this embodiment, font data 111 is only for use with a first print data processing unit 109, while font data 113 is for use with both the first and second print data processing units 109, 110.

Reference numeral 101 generally denotes the printing apparatus of the first embodiment, 102 is a host computer which transmits data to the printing apparatus, 103 is an interface unit which receives print data from the host computer 102, 104 is a CPU which controls processes in the printing apparatus 101, 105 is a print unit, and 106 is a using right determining unit which determines a using right of the first and second print data processing units 109 and 110 and each font data. Print data processing units 109 and 110 execute processing of print data before producing bit map data.

Reference numeral 107 is a ROM which stores a processing program of the CPU 104 and data used in the program, 108 is a RAM which temporarily stores data related to executing the process, 111 and 113 are scalable font data stores, 112 and 114 are producing units which produce bit map data from the scalable font data in store 111 and 113, 115 is a table which stores addresses of font data in stores 111 and 113, 116 is a system bus including address, data and control buses, which transmit data and other signals between the CPU 104 and the other components of the system.

In this first printing apparatus, the CPU 104 controls allowing or prohibiting execution of the print data processing unit 109 and 110 regarding the processing data in accordance with font indicating. Accordingly, it is easy to establish a printing environment which uses a specific print data processing unit and a specific bit map pattern producing unit.

In the second printing apparatus, the CPU 104 understands a condition of set using rights by determining whether each using right corresponds to each other. Accordingly, it is easy to establish a printing environment which uses a specific print data processing unit and a specific bit map pattern producing unit.

FIG. 2 is a diagram showing relationships of a using right number between each print data processing unit 109, 110 and each bit map pattern producing unit 112, 114. The data representing the relationships are appropriately stored in the RAM 108 in FIG. 1.

Reference numerals 201 and 202 in FIG. 2 are the using right numbers which are returned by the print data processing unit 109. Reference numeral 203 is the using right number which is returned by the print data processing unit 110. Reference numeral 204 is the using right number which is returned by the bit map pattern producing unit 112. Reference numeral 205 is the using right number returned by the bit map pattern producing unit 114. As described above, the bit map pattern producing unit 114, which is related to the font data store 113 and the using right number 0020, is capable of being used by either the print data processing unit 109 or 110.

Figure 3:
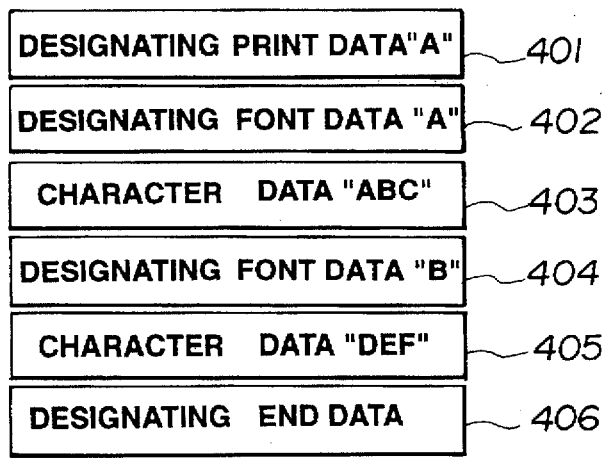
FIG. 3 is a diagram showing an example of inputted print data.
Figure 4:
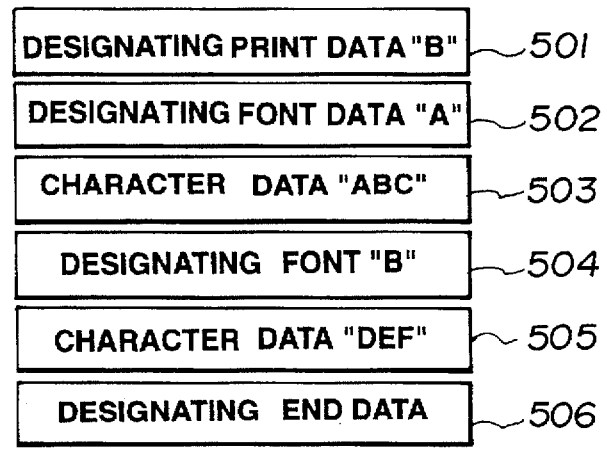
FIG. 4 is a diagram showing another example of inputted print data.

FIG. 3 and FIG. 4 show examples of print data which are transmitted from the host computer 102.

In FIG. 3, 401 indicates print data A, 402 indicates font data A, 403 indicates character data, 404 indicates font data B, 405 indicates character data, and 406 indicates an end of the print data.

In FIG. 4, 501 indicates print data B, 502 indicates font data A, 503 indicates character data, 504 indicates font data B, 505 indicates character data, and 506 indicates an end of the print data.

In this printing apparatus as described above, when the printing apparatus 101 receives the print data from the host computer 102 through the interface unit 103, the print data are temporarily stored in the RAM 108. The CPU 104 determines which of the print data processing units 109 and 110 should execute the print process of the received print data in accordance with information of the ROM 107.

In case that the received data is a group of data 401 shown in FIG. 3, the data are usable by the data processing unit 109. It is then necessary to determine the using right of the print data processing unit 109 and the bit map pattern producing unit 112 because data 402 indicates the font data A (store 111).

The first process of determining a using right according to the printing apparatus of the present invention will be described with reference to the flow chart in FIG. 5.

Figure 5:
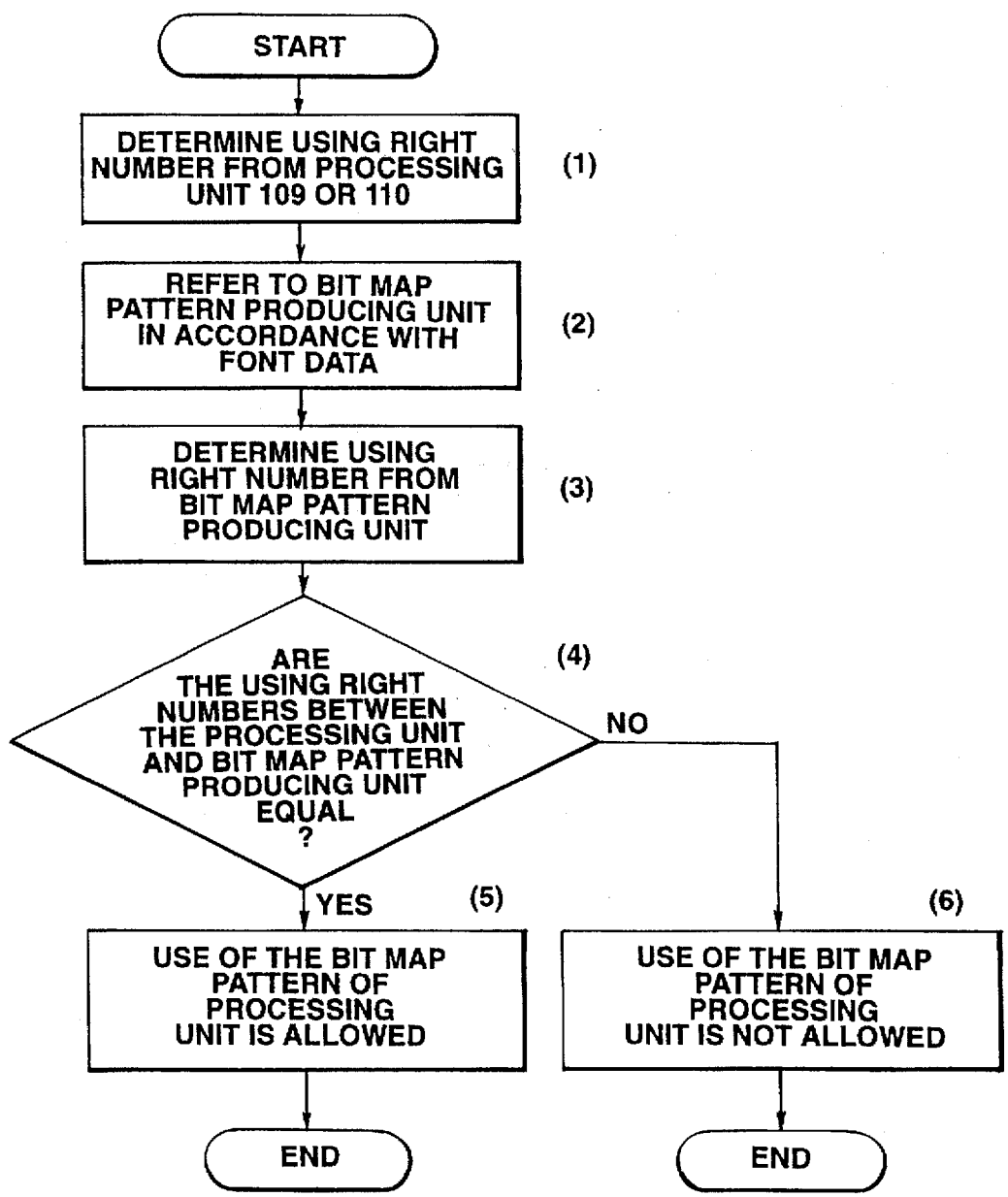
FIG. 5 is a flow chart showing first process of determining a using right.

FIG. 5 is a flow chart showing first process of determining a using right. Reference numerals (1)–(6) in FIG. 5 show each of the steps of the process.

The CPU 104 requests the using right number of the print data processing unit 109 in the case that the data as shown in FIG. 3 are input. The print data processing unit 109 transmits the using right number 201, 202 as shown in FIG. 2 in step (1). The CPU 104 refers to the bit map pattern producing unit 112 in relation to the font data A (store 111) in step (2). The CPU 104 sets the using right number 204 from the bit map pattern producing unit 112 in step (3).

The using right determining unit 106 determines whether the using right number 201 or 202 is equal to the using right number 204 in step (4). If YES in step (4), the print data processing unit 109 is allowed to use the font data A (store 111i and to use a bit map pattern in step (5). Font data A of store 111 is stored in the reading font table 115.

If NO in step (4), the print data processing unit 109 is not allowed to use the font data A or to use a bit map pattern.

After setting the allowance or non-allowance as described above in FIG. 5 the CPU 104 next analyzes the character data 403. The CPU 104 controls printing in accordance with the character data 403.

Then, the CPU 104 analyzes the next print data 404, which is the designating font data. The CPU 104 again executes a process in accordance with the flow chart in FIG. 5. In this case the using right determining unit 106 determines whether the using right number 201 or 202 is equal to the using right number 205 in step (4) in FIG. 5. If the using right numbers are equal, the print data processing 109 is allowed to use the font data B of store 113. The font data B is stored in the reading font table 115.

Then, the CPU 104 analyzes the next print data 405, which is character data, and the CPU 104 controls printing in accordance with the character data 405. When the CPU 104 determines that the next data is the designating end data, the CPU 104 controls discharging of paper on which printing was effected.

In case that the transmitted print data is the group of data shown in FIG. 4, the CPU 104 determines the data is for use by the print data processing unit B 110.

It is necessary to determine the using right because the next data 502 designates the font data A.

The CPU 104 begins the determining process of the using right in accordance with the flow chart in FIG. 5. The CPU 104 requests the using right number of the print data processing unit 110. The print data processing unit 110 transmits the using right number 203 as shown in FIG. 2 to the CPU 104 in step (1), and the CPU 104 refers to the bit map pattern producing unit 112 in relation to the font data A 111 in step (2).

The CPU 104 receives the using right number 204 from the bit map pattern producing unit 112 in step (3). The using right determining unit 106 determines whether the using right number 203 of the print data processing unit 110 is equal to the using right number 204 of the bit map pattern producing unit 112 in step (4).

The result is NO in step (4) in this case. Therefore, the flow advances to step (6). In step (6), the print data processing unit 109 is not permitted to use the font data A of store 111 in step (6), and the process is finished.

After setting the allowance or non-allowance as described above in FIG. 5, the CPU 104 analyzes the next print data, character data 503. The CPU 104 controls printing in accordance with the character data 503.

Then the CPU 105 analyzes the next print data 504, the designating font data. The CPU 104 again executes the process in accordance with the flow chart in FIG. 5. In this case, the using right determining unit 106 determines whether the using right number 203 of the print data processing unit 110 is equal to the using right number 205 of the bit map pattern producing unit 114 in step (4) of FIG. 5.

In this case, the result of the step (4) is YES referring to FIG. 2. Therefore, the print data processing unit 110 is permitted to use the font data B of store 113 and to use a corresponding bit map pattern, and the font data B is stored in the reading font table 115.

Then, the CPU 104 analyzes the next print data, character data 505. The CPU 104 controls printing in accordance with the character data 505. Then, the CPU 104 analyzes the next print data 506, designating end data. Therefore, the CPU 104 controls exhausting of the paper on which printing was effected.

As described above, the font data A of store 111 is controlled to be only for use by the print processing unit A 109 and the font data B 113 is controlled to be for use by the print processing unit A 109 or B 110.

Second Embodiment

Figure 6:
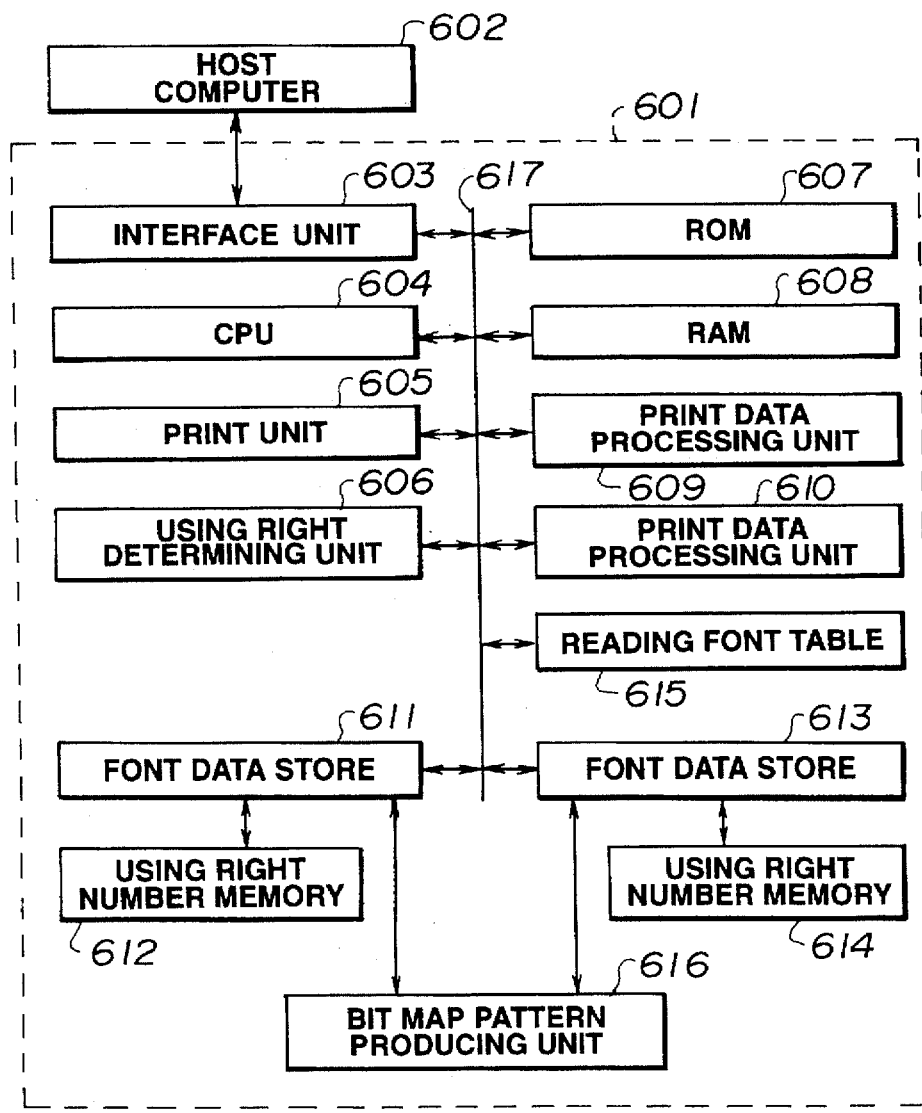
FIG. 6 is a block diagram showing a construction of a printing apparatus according to the second embodiment of the present invention.

FIG. 6 is a block diagram showing a construction of the control section of the second embodiment of the present invention.

In FIG. 6, 601 generally denotes the printing apparatus, 602 is a host computer which transmits data to the printing apparatus 601, 603 is an interface which receives print data from the host computer 602, 604 is a CPU which controls processes in the printing apparatus 601, 605 is a print unit, 606 is a using right determining unit which determines using rights of print processing units 609 and 610, units 609 and 610 execute processing of print data before producing bit map data. Reference numeral 607 is a ROM which stores a control program for the CPU 604 and data used in the program, 608 is a RAM which temporarily stores data related to executing of the process, 611 and 613 are scalable font data stores, 612 and 614 are using right number memories which store using right numbers of the font data stores 611 and 613, 616 is a bit map pattern producing unit which converts the scalable font data to a bit map pattern, 615 is a reading font table which stores addresses of the font data 611 and 613, 617 is a system bus including address, data and control buses, which transmit data between the CPU 604 and the various system components.

As shown in FIG. 6, the using right number memories 612 and 614 are respectively for use by the font data stores 611 and 613.

The apparatus of the embodiment of FIG. 6 also operates according to the process described in the flow chart of FIG. 5 and the operation thereof will not be described in further detail.

Third Embodiment

Figure 7:
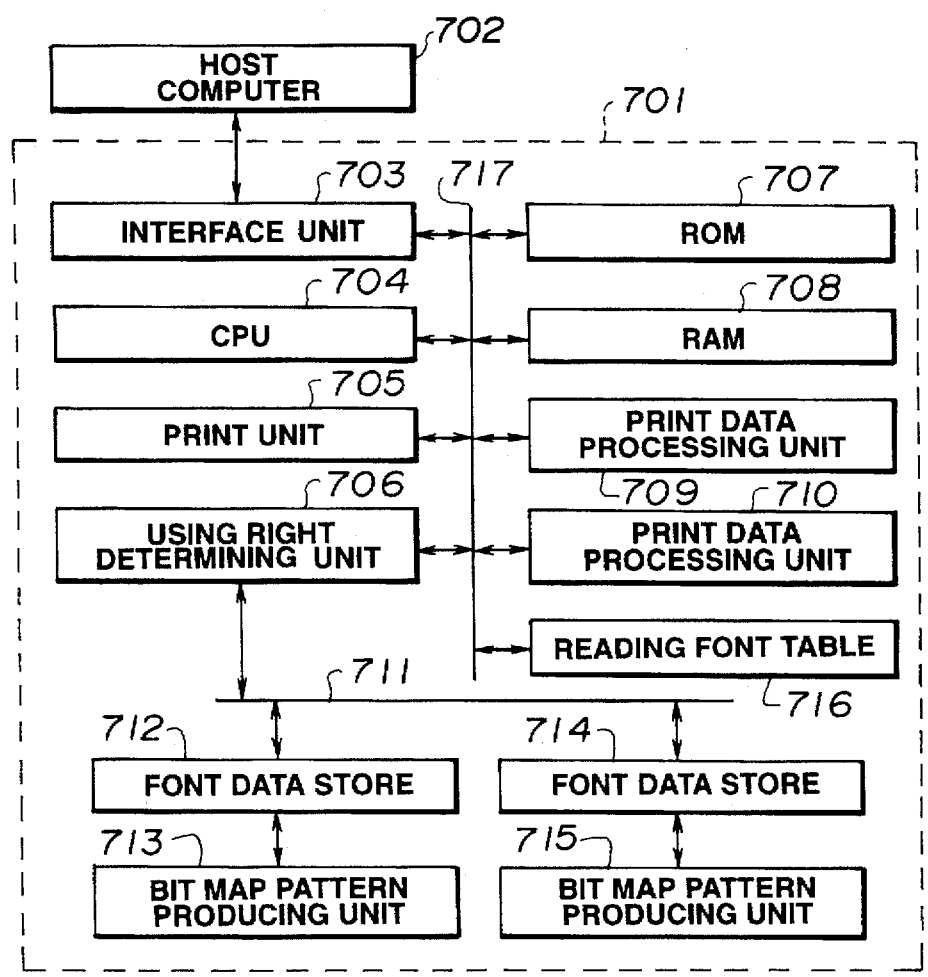
FIG. 7 is a block diagram showing a construction of a printing apparatus according to the third embodiment of the present invention.

FIG. 7 is a block diagram showing a control section of the third embodiment of the present invention.

In FIG. 7, 701 generally denotes the printing apparatus, 702 is a host computer which transmits data to the printing apparatus 701, 703 is an interface which receives print data from the host computer 702, 704 is a CPU which controls processes in the printing apparatus 701, 705 is a print unit, 706 is a using right determining unit which determines a using right of print data processing units 709 and 710, units 709 and 710 execute processing of print data before producing bit map data, 707 is a ROM which stores a control program for the CPU 704 and data used in the program, 708 is a RAM which temporarily stores data related to executing of the process, 711 is a system bus between the using right determining unit 706 and scalable font data stores 712 and 714, 713 and 715 are bit map pattern producing units which convert the scalable font data to a bit map pattern, 716 is a reading font table which stores addresses of the font data in stores 712 and 714, and 717 is a system bus which transfers data between the CPU 704 and the various system components.

In the embodiment above, for example, the print data processing units 709, 710 refer to the font data through the using right determining unit 706. Therefore, the print data processing unit 710 is not allowed to use the font data 712. The apparatus of the embodiment of FIG. 7 otherwise operates according to the flow chart in FIG. 5 and a detailed description of the operation thereof will not be provided herein.

As described above in the printing apparatus in FIG. 1, the print data processing unit 110 can refer to the font data 111 without determining by the using right determining unit 106. On the other hand, the print data processing unit can only refer to the font data after determining by the using right determining unit 706 in the embodiment shown in FIG. 7.

Fourth Embodiment

Figure 8:
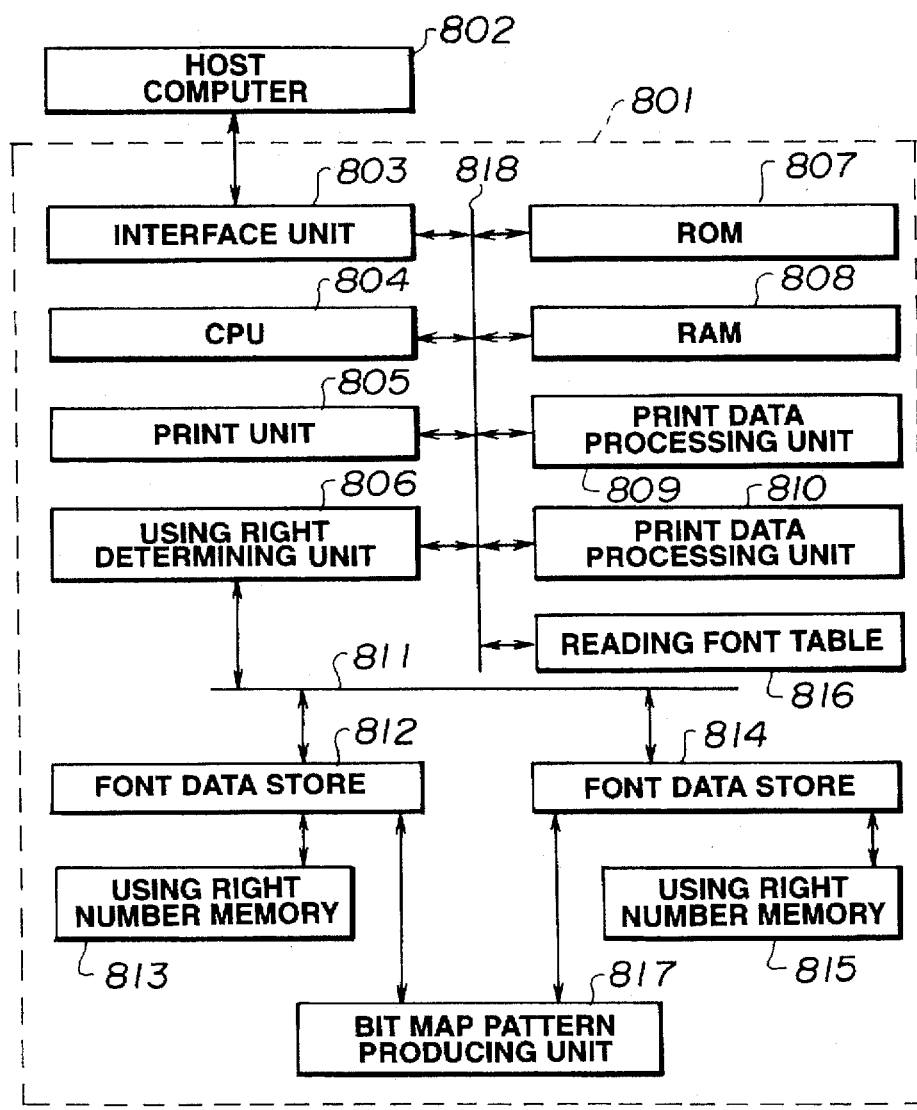
FIG. 8 is a block diagram showing a construction of a printing apparatus according to the fourth embodiment of the present invention.

FIG. 8 is a block diagram showing a construction of the printing apparatus of the fourth embodiment of the present invention.

In FIG. 8, 801 generally denotes the printing apparatus, 802 is a host computer which transmits data to the printing apparatus 801, 803 is an interface which receives print data from the host computer 802, 804 is a CPU which controls processing in the printing apparatus 801, 805 is a print unit, 806 is a using right determining unit which determines using rights of print data processing units 809 and 810 and font data stores 812 and 814, units 809 and 810 execute processing of print data before producing bit map data, 807 is a ROM which stores a control program for the CPU 804 and data used in the program, 808 is a RAM which temporarily stores data related to executing of the process, 811 is a system bus between the using right determining unit 806 and scalable font data stores 812 and 814, 813 and 815 are using right number memories, 817 is a bit map pattern producing unit which converts the scalable font data from stores 812, 814 to a bit map pattern, 816 is a reading font table which stores addresses of the font data from stores 812 and 814, and 818 is a system bus which transfers data between the CPU 804, and the RAM 808 and the various system components.

As described above, for example, the print data processing units 809, 810 refer to the font data in stores 812, 814 through the using right determining unit 806. Therefore, the print data processing unit 810 does not use the font data in store 812. On the other hand, regardless of the font data used, the bit map pattern producing unit 817 can always be used.

The apparatus of the fourth embodiment also operates according to the flow chart in FIG. 5.

As described above, in the first to fourth embodiments, after comparing each using right number of the print data processing unit and the font data, access to the font data is determined.

As described in the following fifth to eighth embodiments, after logical multiplication of the using right signs between the processing units and the producing units, access to the font data can be determined.

Fifth Embodiment

Figure 9:
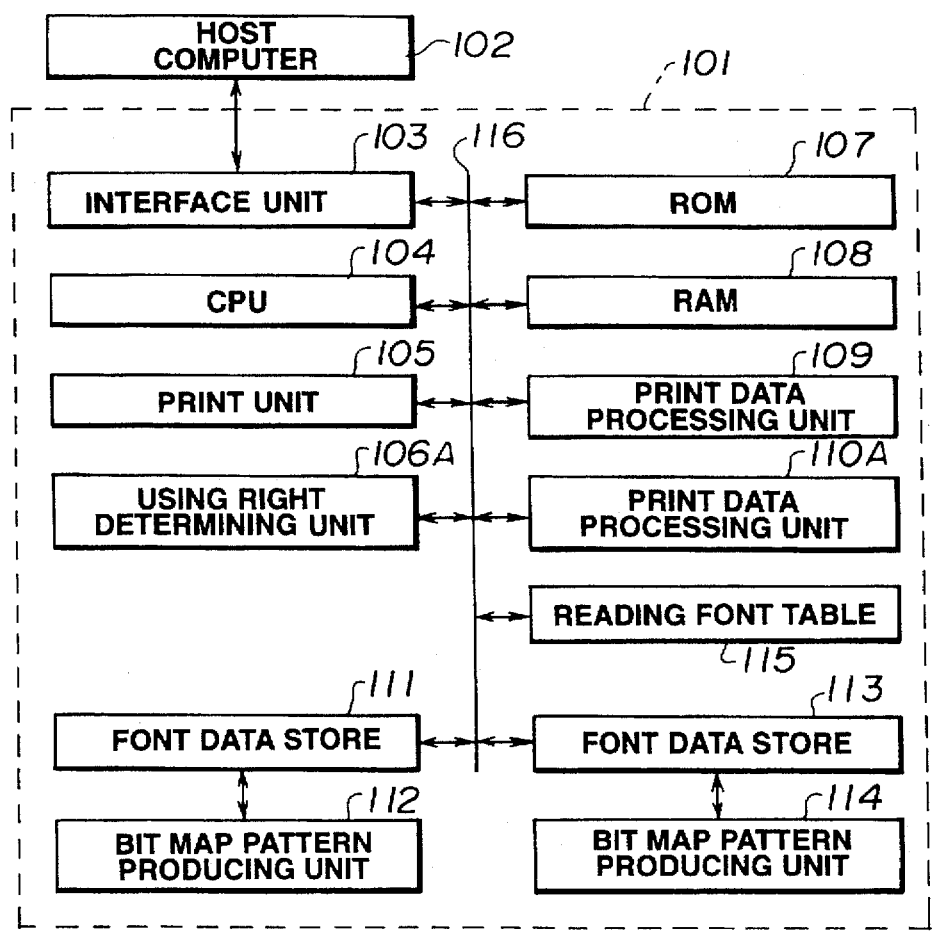
FIG. 9 is a block diagram showing a construction of a printing apparatus according to the fifth embodiment of the present invention.

FIG. 9 is a block diagram showing a construction of the printing apparatus of the fifth embodiment of the present invention. Reference characters identical to those used in FIG. 1 represent similar components and will not be discussed in further detail.

Reference numeral 106A in FIG. 9 is a using right determining unit which analyzes the designating data of the printing data processing unit and data of the bit map pattern producing unit. The using right determining unit 106A controls allowing access to each font data store in accordance with the result of logical multiplication of a using right sign of each print data processing unit and each bit map pattern producing unit.

In this printing apparatus, the using right determining unit 106A determines conditions of setting using rights in accordance with the result of the logical multiplication of the each using right sign. Therefore, it is easy to establish a printing environment which uses a specific print data processing unit and a specific bit map pattern processing unit.

Figure 10:
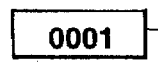
FIG. 10 is a diagram showing a relation between data of logical multiplication and data of using right signs of the using right determining unit shown in FIG. 9.
Figure 10:
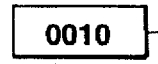
Figure 10:
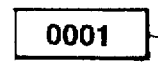
Figure 10:
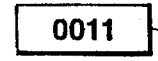
Figure 10:
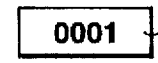
Figure 10:
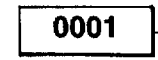
Figure 10:
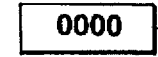
Figure 10:
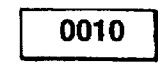

FIG. 10 is a diagram showing a relation between data of logical multiplication and sign data of using right of the using right determining unit shown in FIG. 9.

Reference numerals 201A and 202A in FIG. 10 are the using right signs for the print data processing units 109 and 110, 203A is the using right sign for the bit map pattern producing unit 112, 204A is the using right sign for the bit map pattern producing unit 114, 205A is a logical multiplication data of the using right sign 201A and the using right sign 203A, 206A is a logical multiplication data of the using right sign 201A and the using right sign 204A, 207A is a logical multiplication data of the using right sign 202A and the using right sign 203A, 208A is a logical multiplication data of the using right sign 202A and the using right sign 204A.

The second using right determining process will be described with reference to the flow chart of FIG. 11.

Figure 11:
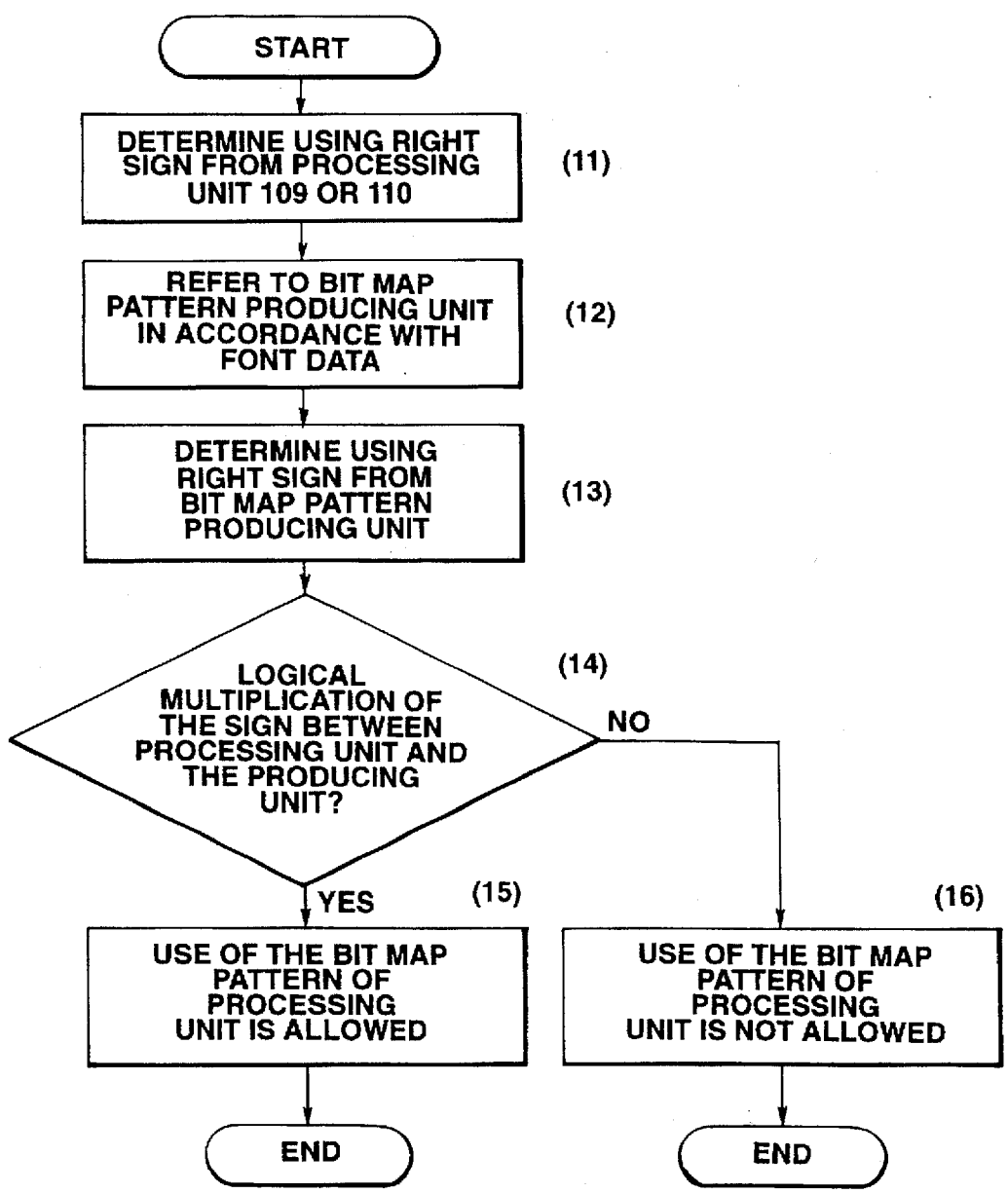
FIG. 11 is a flow chart showing a second process of determining a using right.

Reference numerals (11)–(16) in FIG. 11 show each of the steps of the process.

In the case that the transmitted print data is the group of data shown in FIG. 3, the CPU 104 requests the using right sign of the print data processing unit 109 in FIG. 9. The print data processing unit 109 transmits the using right sign 201A in step (11). The CPU 104 refers to the bit map pattern producing unit 112, in accordance with font data 402 is step (12).

In step (13) the CPU 104 determines the using right sign 203A from the bit map pattern producing unit 112 determined in Step (12). The using right determining unit 106A determines whether the using right sign 201A or 202A is equal to the using right sign 203A in step (14) by executing logical multiplication. If YES in step (14), the print data processing unit 109 is allowed to use the font data from store 111 and to use a bit map pattern, and the process ends in step (15). If NO in step (14), the print data processing unit 109 is not permitted to use the font data from store 111 and to use a bit map pattern in step (16).

In this case, the result of logical multiplication of sign of 201A and 203A shown in FIG. 10 is 0001. Therefore, the result is YES in step (14) and the print data processing unit 109 is allowed to use the font data from store 111. The font data 111 is then stored in the reading font table 115. Next, the CPU 104 analyzes the next print data 403 (reference to FIG. 3), character data, and the CPU 104 controls printing. Next, the CPU 104 analyzes the next print data 404, which designates fonts. Therefore, the CPU 104 again executes a process in accordance with the flow chart shown in FIG. 11. In step (14), the using right determining unit 106A determines whether the using right sign 201A is equal to the using right sign 204A. The result of the logical multiplication 206A is 0001. Accordingly, the result is YES in step (14). The print data processing unit 109 is allowed to use the font data from store 113 and the font data from store 113 is stored in the reading font table 115.

Next, the CPU 104 analyzes the next print data 405, character data, and the CPU 104 controls printing. Next, the CPU 104 analyzes the next print data 406, which designates the end of print data, and the CPU 104 controls exhausting of paper on which printing was effected.

In the case that the transmitted print data is the group of data shown in FIG. 4, the CPU 104 recognizes that the data is for use by the print data processing unit 110. It is necessary to determine the using right because the next data 502 designates the font data from store 111. Therefore, the CPU 104 begins the determining process of the using right in accordance with the flow chart in FIG. 11.

Initially, the CPU 104 requests the using right sign of the print data processing unit 110. The print data processing unit 110 transmits the using right sign 202A as shown in FIG. 10 to the CPU 104 in step (11). Next, the CPU 104 refers to the bit map pattern producing unit 112 in relation to the font store 111 in step (12).

The bit map pattern producing unit 112 transmits the using right sign 203A in step (13). The using right determining unit executes the logical multiplication of the using right sign 202A and 203A. Then the CPU 104 receives a result of the logical multiplication 207A. The result 207A is 0000. Therefore, the result is NO in step (14) in FIG. 11, and the flow advances to step (16). The print data processing unit 109 is not allowed to use the font data 111 and to use its bit map pattern, and the process ends.

Then the CPU 104 analyzes the next print data 503 in FIG. 4, character data, and the CPU 104 controls printing. Next, the CPU 104 analyzes the next print data 504, font designating data. Therefore, the CPU 104 begins designating fonts again in accordance with the flow chart of FIG. 11.

Next, the using right determining unit 106A executes a logical multiplication of the using right sign 202A and 204A. The result of the logical multiplication 208A is 0010 as shown in FIG. 10. Therefore, the result is YES in step (14). The flow advances to step (15) and the print data processing unit 109 is allowed to use the font data in store 113 and to use a bit map pattern. The font data in store 113 is stored in the reading font table 115. Next, the CPU 104 analyzes the next data 505, character data and the CPU 104 controls printing. Next, the CPU 104 analyzes the next data 506, which indicates that the print data is finished, and the CPU 104 controls exhausting of paper on which printing was executed.

As described above, in the foregoing embodiment, a printing system is easily set up such that the font data in store 111 is only used for the print data processing unit 109 and the font data in store 113 is used for the print data processing units 109 and 110.

Sixth Embodiment

Figure 12:
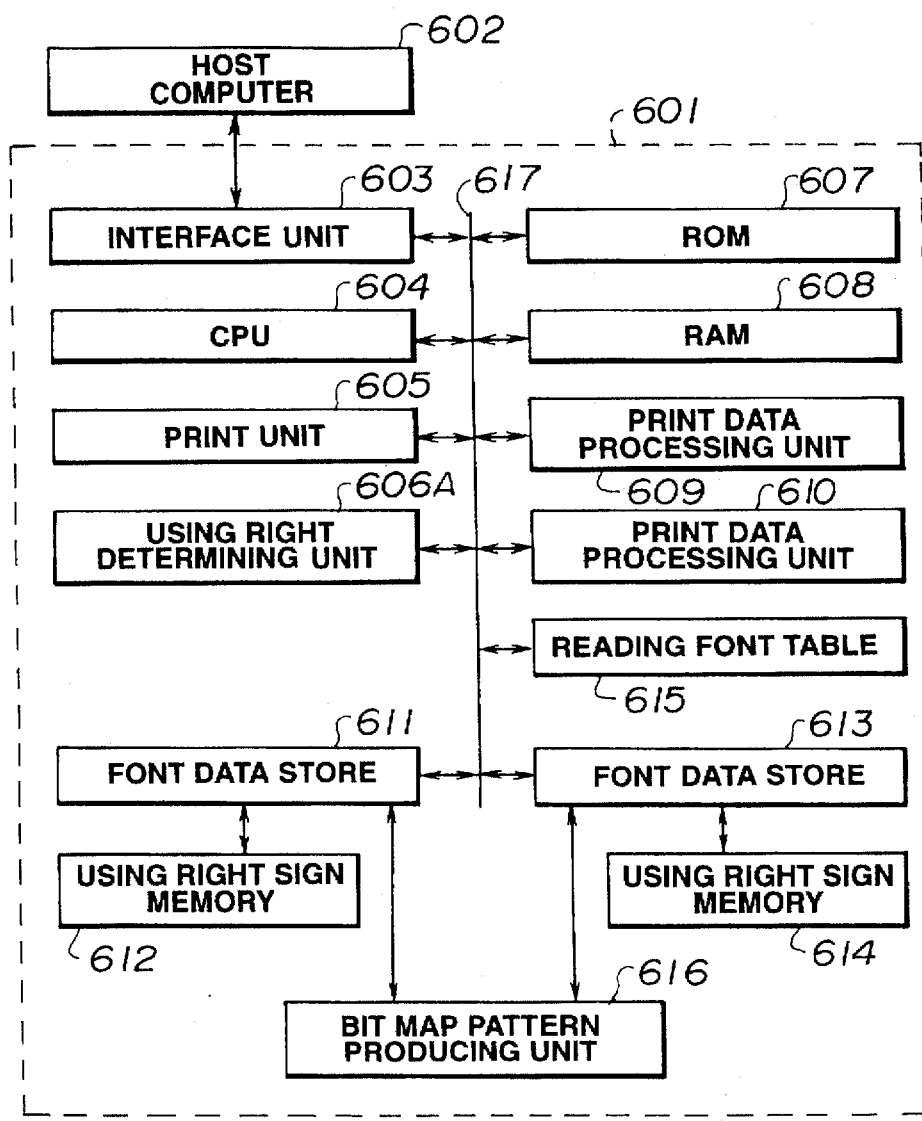
FIG. 12 is a block diagram showing a construction of a printing apparatus according to the sixth embodiment of the present invention.

FIG. 12 is a block diagram showing construction of a printing apparatus according to the sixth embodiment of the present invention. In FIG. 12, like reference characters are used to represent like elements as in FIG. 6.

In FIG. 12, 606A is using right determining unit which determines the using right of the print data processing unit and the font data. In response to the logical multiplication of the using right sign of each printing data processing unit and each bit map pattern producing unit, the using right determining unit controls an access to each font data store in accordance with the flow chart in FIG. 11.

As shown in FIG. 12, the using right sign memories 612 and 614 are respectively for use by the font data stores 611 and 613.

The apparatus of the embodiment of FIG. 12 also operates according to the process described in the flow chart of FIG. 11 and the operation thereof will not be described in further detail.

Seventh Embodiment

Figure 13:
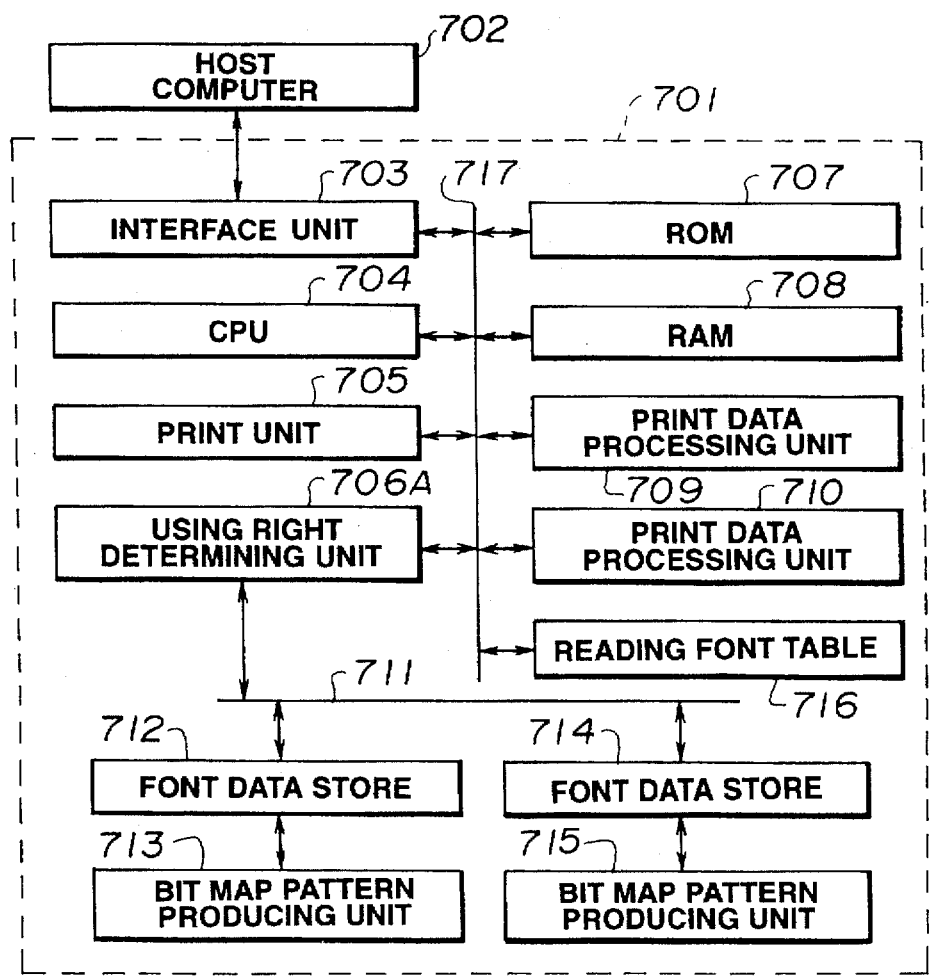
FIG. 13 is a block diagram showing a construction of a printing apparatus according to the seventh embodiment of the present invention.

FIG. 13 is a block diagram showing construction of a printing apparatus according to the seventh embodiment of the present invention. In FIG. 13, like reference characters are used to represent like elements as in FIG. 7.

In FIG. 13, 706A is a using right determining unit which determines using rights of the print data processing unit and font data.

The using right determining unit 706A controls access to each font data store in response to the logical multiplication of each using right sign of each print data processing unit and each bit map pattern producing unit in accordance with the flow chart shown in FIG. 11.

As shown in FIG. 13, each print data processing unit can refer to font data only through the using right determining unit 706A.

The apparatus of the embodiment of FIG. 13 also operates according to the process described in the flow chart of FIG. 11 and the operation thereof will not be described in further detail.

As described above in the printing apparatus in FIG. 9, the print data processing unit 110 can refer to the font data 111 without determining by the using right determining unit 106A. On the other hand, the print data processing unit can only refer to the font data after determining by the using right determining unit 706A as shown in FIG. 13.

Eighth Embodiment

Figure 14:
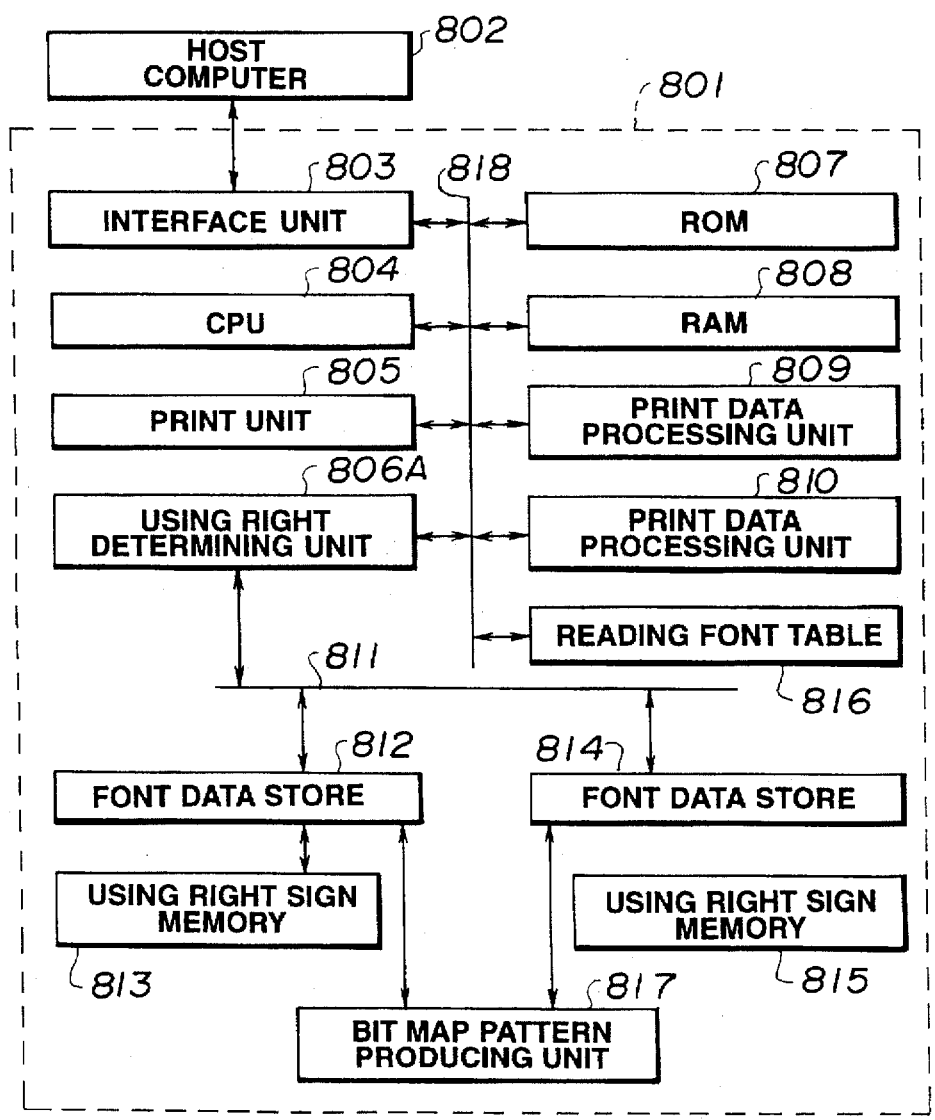
FIG. 14 is a block diagram showing a construction of a printing apparatus according to the eighth embodiment of the present invention.

FIG. 14 is a block diagram showing construction of a printing apparatus according to the eighth embodiment of the present invention. In FIG. 12 like reference characters are used to represent like elements in FIG. 8. In FIG. 14, 806A is a using right determining unit which judges using rights of the print data processing unit and font data. The using right determining unit 806A controls an access to each font data store in response to the logical multiplication of each using right sign of each print data processing unit and each bit map pattern producing unit in accordance with the flow chart in FIG. 11.

As shown in FIG. 14, each print data processing unit can refer to font data only through the using right determining unit 806A. Therefore the bit map pattern producing unit 817 is common to the print data processing units 809, 810.

The apparatus of the embodiment of FIG. 14 also operates according to the process described in the flow chart of FIG. 11 and the operation thereof will not be described in further detail.

As described above, in the first to eighth embodiments, after comparing each using right number or logical multiplication of the sign between the print data processing units and the font data stores, an access to the font data stores can be allowed or not. But, as described in the following embodiments, after both comparing each using right number and logically multiplying each using right sign, the access can finally be allowed or not allowed.

Ninth Embodiment

Figure 15:
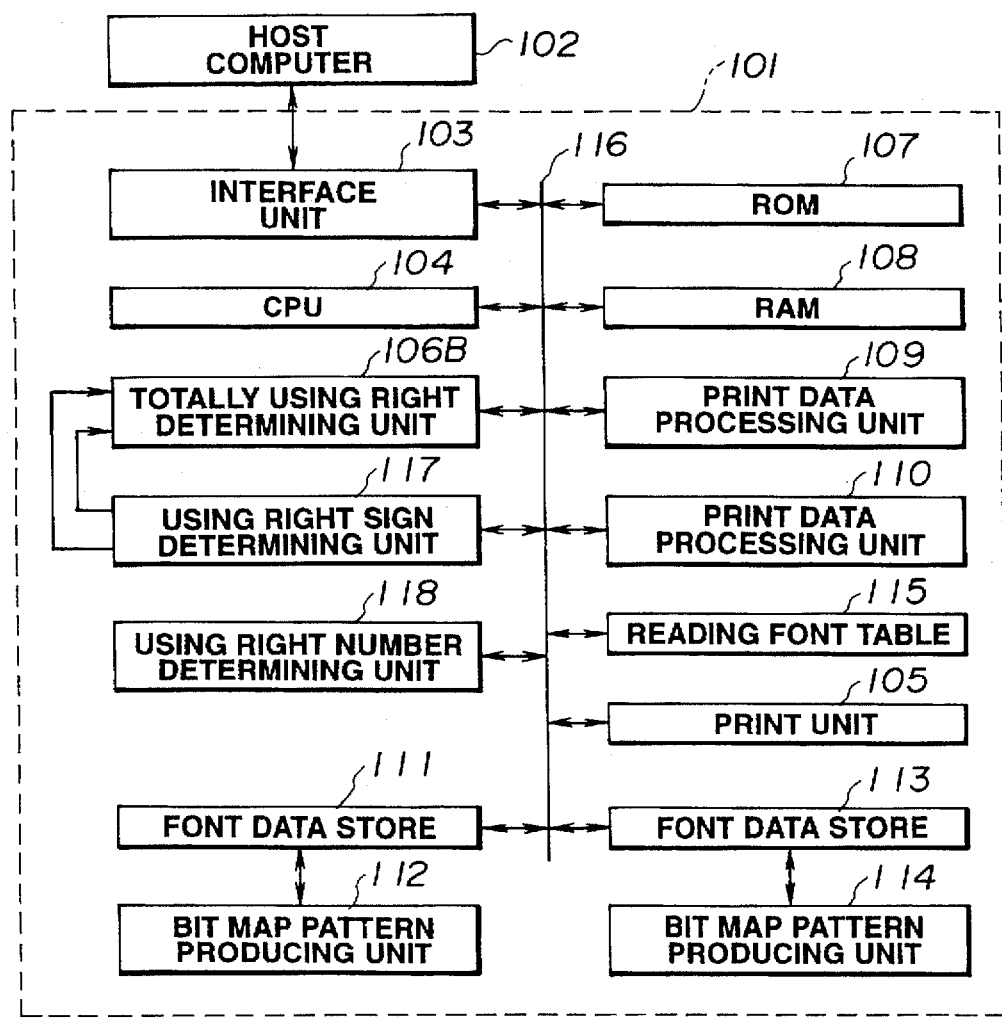
FIG. 15 is a block diagram showing a construction of a printing apparatus according to the ninth embodiment of the present invention.

FIG. 15 is a block diagram showing the construction of a printing apparatus according to the ninth embodiment of the present invention. In FIG. 15, like reference characters are used to represent like elements as in FIG. 1.

In FIG. 15, 106B is a total using right determining unit. The total using right determining unit 106B controls access to each font data store in accordance with the result of the using right sign determining unit 117 and the using right number determining unit 118.

The using right sign determining unit 117 executes a logical multiplication of each using right sign of each print data processing unit and each bit map pattern producing unit. The result is transmitted to the total using right determining unit 106B.

The using right number determining unit 118 compares the using right number of each print data processing unit and each bit map pattern producing unit, and the using right number determining unit 118 transmits the comparison result (true or false) to the total using right determining unit 106B.

In this printing apparatus, the total using right determining unit 106B judges a condition of a set using right in accordance with the result of the logical multiplication of each using right sign and the comparison of each using right number. Therefore, it effectively makes a high degree print data process system which uses special data process units and special bit map producing units.

Figure 16:
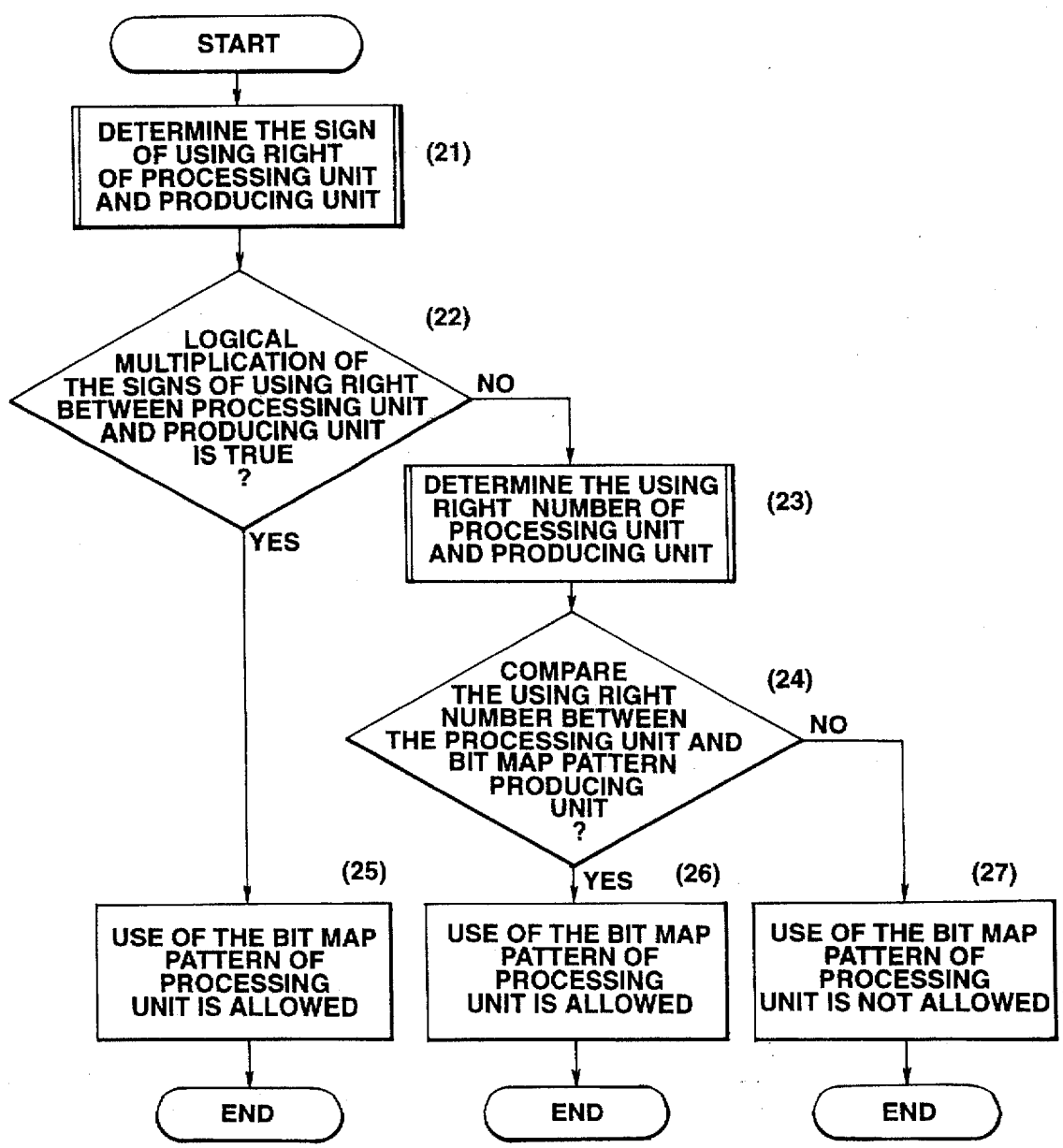
FIG. 16 is a flow chart showing a third process of determining a using right.

The third process of determining a using right according to the printing apparatus of the present embodiment will be described with reference to the flow chart in FIG. 16. Reference numerals (21)–(27) in FIG. 16 show each step of the process.

In case that the received data is the group of data as shown in FIG. 3, the CPU 104 determines the data is for use by the print processing unit 109, and the next data 402 is for indicating the font data A in store 111. Therefore, the CPU 104 begins the process in FIG. 16.

Initially, the CPU 104 executes a process for determining using right signs of the print data processing unit and the bit map pattern producing unit in step (21). The using right sign determining unit 117 executes a logical multiplication of the using right sign 203B and a using right sign 205B (referring to FIG. 17 and which is produced in step (21) in FIG. 16), in step (22) in FIG. 16. The result is transmitted to the total using right determining unit 106B. The result is 0001, and therefore is YES in step (22). The flow advances to step (25). The print data processing unit 109 is permitted to use the font data of store 111 in step (25), and the font data of store 111 is stored in the reading font table 115. When the CPU 104 analyzes the next data 403, character data, the CPU 104 controls printing.

Next, the CPU 104 analyzes the print data 404, designating font data. Therefore, the using right sign determining unit 117 executes a logical multiplication of the using right sign 201B and 204B (in FIG. 17). The result 206B in FIG. 17 is 0000. Therefore, the result is NO in step (22) and the print data processing unit 109 is not permitted to use the font data 113. But there is a possibility of permitting use by the using right number. Therefore, the CPU 104 executes a process of step (23) in FIG. 16. In step (23), the CPU 104 determines the using right number of the print processing unit and the bit map pattern producing unit. Next, the using right number determining unit 118 compares the using right numbers 201 and 202 which are the results of the process in step (23) and the using right number 205 (refer to FIG. 2). And the result, in this case it is true, is transmitted to the total using right determining unit 106B in FIG. 15. The total using right determining unit 106B determines whether the using right number 202 is equal to the using right number 205 in step (24). The result is true in this case in step (24). The flow advances to step (26) and the font data is stored in the reading font table 115.

Next, the CPU 104 analyzes the next data 405 in FIG. 3, character data. Therefore, the CPU 104 controls printing. The next data 406 indicates that the print data is finished, and the CPU 104 controls discharging papers on which printing was effected.

In case that the received data is the group of data as shown in FIG. 4, the CPU 104 determines the data is for use by the print processing unit 110, and the next data 502 is for indicating the font data A in store 111. Therefore, the CPU 104 begins the process in FIG. 16.

The CPU 104 executes the process for determining the using right signs of the print data processing unit and the bit map pattern producing unit in step (21). The using right sign determining unit 117 executes a logical multiplication of the using right sign 203B in FIG. 17 and a using right sign 202B which is produced in step (21) in FIG. 16. The result 207B (0000) is transmitted to the total using right determining unit 106B. Therefore, the result is not true (NO) in step (22). The print data processing unit 109 is not permitted to use the font data 111. The flow advances to step (23). In step (23), the CPU 104 executes the process of determining the using right number of the processing unit and producing unit. The using right number determining unit 118 compares the using right numbers 203 and 204 which are the results of the process in step (23). And the result, which in this case is not true, is transmitted to the total using right determining unit 106B in FIG. 15. The total using right determining unit 106B determines whether the using right number 203 is equal to the using right number 204 in step (23). In this case, the result is not true in step (24). Therefore the flow advances to step (27) where the print data processing unit 110 is not permitted to use the font data 111 yet.

Next, the CPU 104 analyzes the next data 503 in FIG. 4, character data. Therefore, the CPU 104 controls printing. The next data 504 indicates a font. The CPU 104 again begins the process in FIG. 16. In step (22), the using right sign determining unit 117 executes a logical multiplication of the using right sign 201B and 204B (refer to FIG. 17) and which is produced in step (21) in FIG. 16. The result is transmitted to the total using right determining unit 106B. The transmitted result is 0000; therefore, the result is not true (NO) in step (22).

The flow advances to step (23). In step (23), the CPU 104 determines the using right number 203, 205. Next, the using right number determining unit 118 compares the using right numbers 203 and 205. And in this case, the result is true (YES). Therefore, the print data processing unit 110 is permitted to use the font data from store 113, and the font data from store 113 is stored in the reading font table 115.

Next, the CPU 104 analyzes the next print data 503 shown in FIG. 4, character data, and the CPU 104 controls printing. Next, the CPU 104 analyzes the next print data 504, which indicates fonts. Therefore, the CPU 104 begins the process in FIG. 16. The total using right determining unit 106B determines whether the using right number 203 is equal to the using right number 205 in step (24). In this case, the result is true in step (24). Therefore, the flow advances to step (26), the print data processing unit 109 is permitted to use the font data of store 113, and the font data of store 113 is stored in the reading font table 115.

Next, the CPU 104 analyzes the next data 505 in FIG. 4, which is character data, and the CPU 104 controls printing. Next, the CPU 104 analyzes the next data 506, which indicates the end of print data. Therefore, the CPU 104 controlling discharge of the paper.

As described above, the process and apparatus efficiently sets up a printing system in which the font data in store 111 is only used for the print data processing unit 109 and the font data in store 113 is used for the print data processing units 109 and 110.

Figure 18:
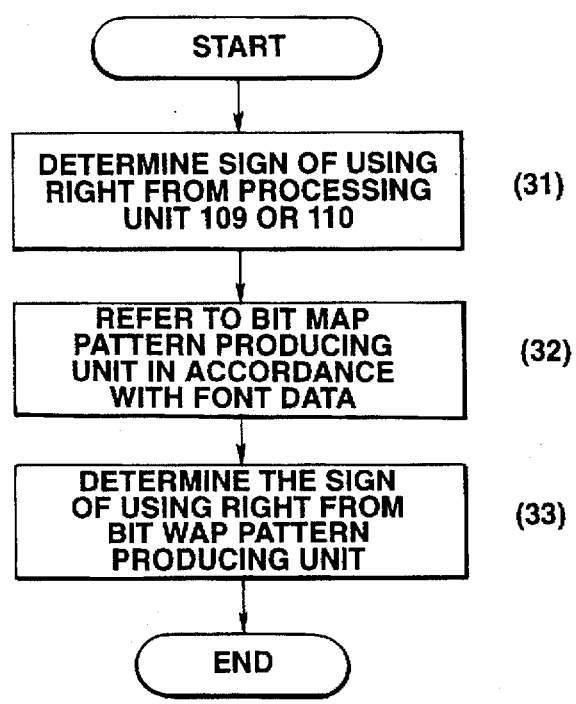
FIG. 18 is a flow chart showing a sub-process of determining a sign of using right in step (21) shown in FIG. 16.

FIG. 18 is a flow chart which shows a detailed sub-process of step (21) in FIG. 16. Reference numerals (31)–(33) denote each step of the process. At first, the CPU 104 requests the using right sign of the print data processing unit 109. The print data processing unit 109 transmits the using right sign 201A of FIG. 10 in step (31). Next, the CPU 104 refers to the bit map pattern producing unit 112 in accordance with the font data in step (32). Next, the CPU 104 determines the using right sign 203A from the bit map pattern producing unit 112 in step (33). After that, the process advances to the flow in FIG. 16. As described above, the CPU 104 determines the necessary using right information.

Figure 19:
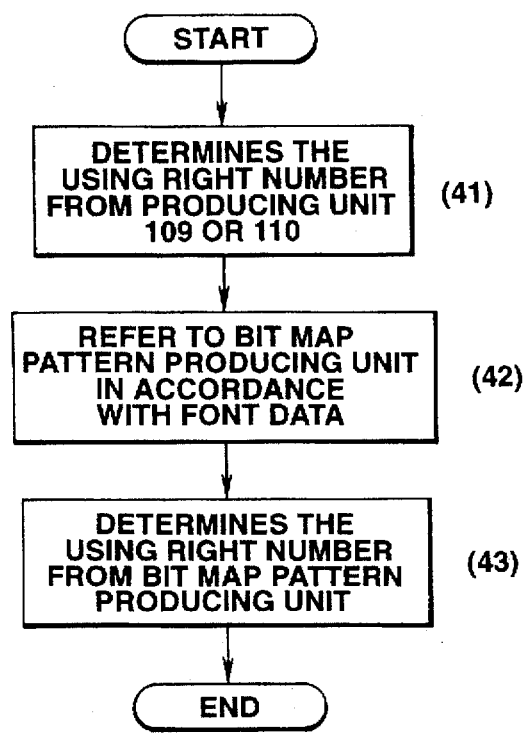
FIG. 19 is a flow chart showing a sub-process of determining a using right number in step (23) shown in FIG. 16.

FIG. 19 is a flow chart showing a sub-process of determining a using right number shown in step (23) in FIG. 16. Reference numerals (41)–(43) denote each step of the process.

At first, the CPU 104 requests the using right number of the print data processing unit 109. The print data processing unit 109 transmits the using right number 201, 202 in step (41). The CPU 104 refers to the bit map pattern producing unit 114 in accordance with the font data in step (42) in FIG. 19.

Next, the CPU 104 determines the using right number 205 from the bit map pattern producing unit 114 in step (3). The process advances to the flow in FIG. 16. As described above, the CPU 104 determines the necessary using right information.

Tenth Embodiment

Figure 20:
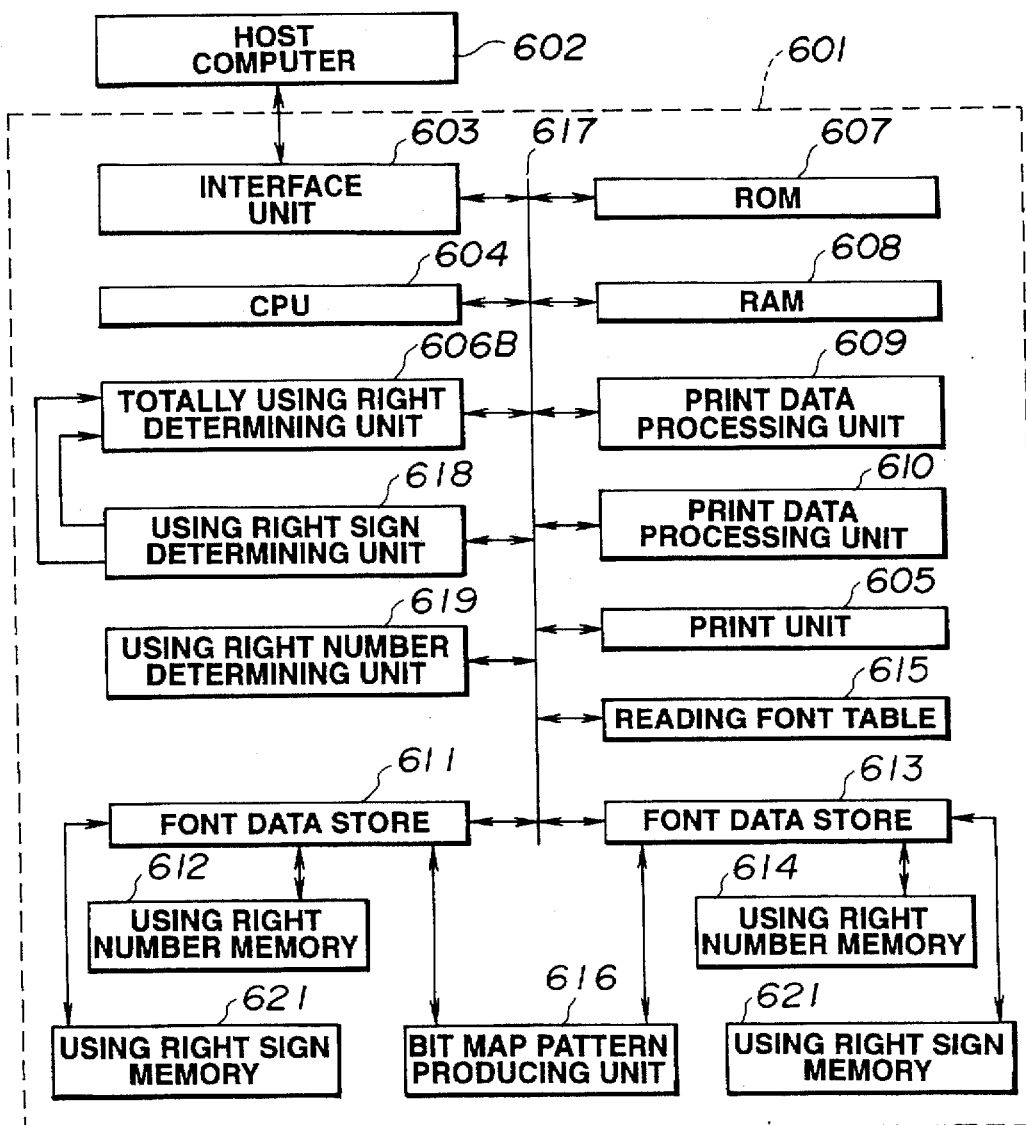
FIG. 20 is a block diagram of a construction of a printing apparatus according to the tenth embodiment of the present invention.

FIG. 20 is a block diagram of the construction of a printing apparatus according to the tenth embodiment of the present invention. Like reference characters refer to like components in FIG. 6.

In FIG. 20, 606B is a total using right determining unit. The total using right determining unit 606B controls an access to each font data store in accordance with the flow chart in FIG. 16 with reference to the results of the using right sign determining unit 618 and the using right number determining unit 619.

The using right sign determining unit 618 executes the logical multiplication of the using right signs of each print data processing unit and each bit map pattern producing unit, and the result is transmitted to the total using right determining unit 606B.

The using right number determining unit 619 compares each using right number of each print data processing unit and each bit map pattern producing unit, and the result is transmitted to the total using right determining unit 606B.

As shown in FIG. 20, the using right number memories 612 and 614 are respectively for use by the font data stores 611 and 613.

The apparatus of the embodiment of FIG. 20 also operates according to the process described in the flow chart of FIG. 16 and the operation thereof will not be described in further detail.

Eleventh Embodiment

Figure 21:
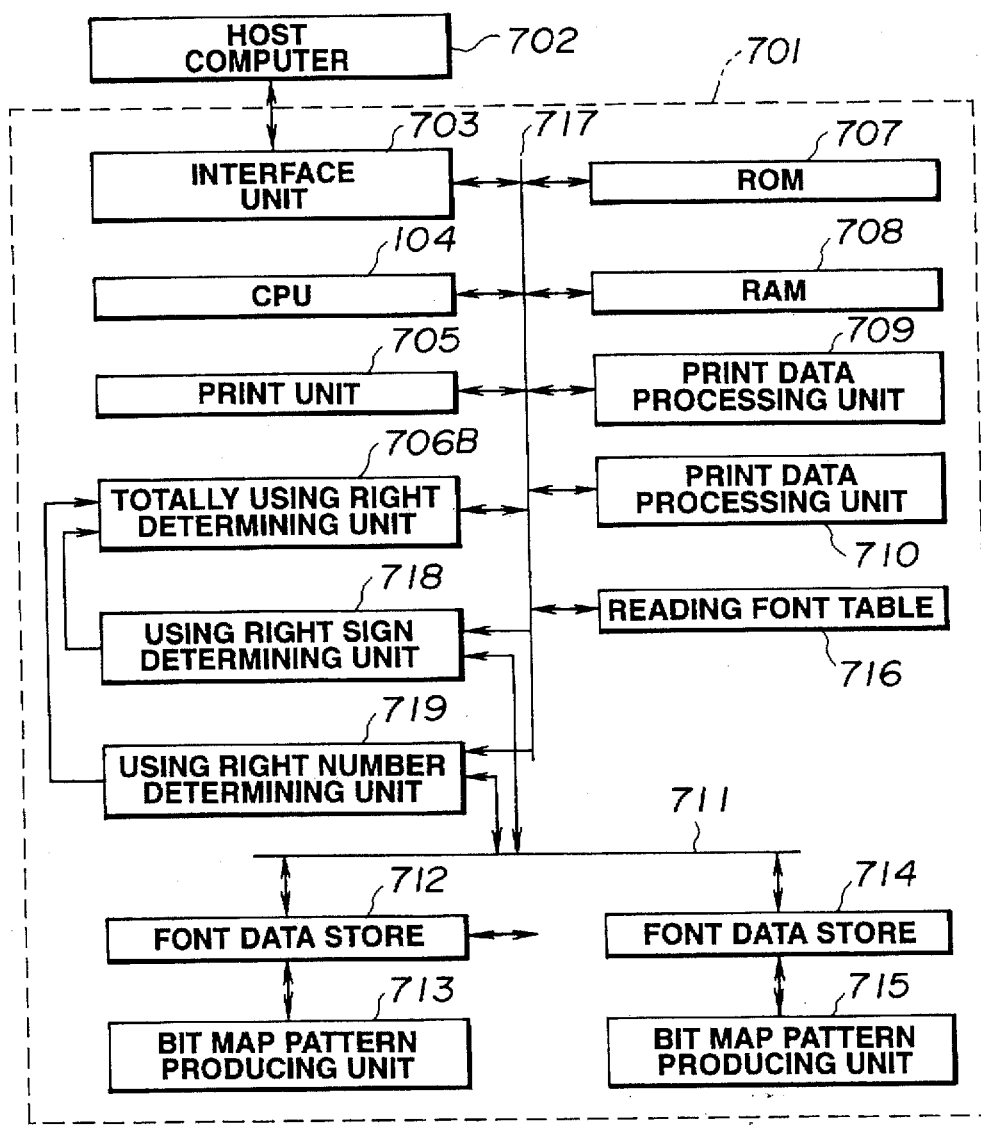
FIG. 21 is a block diagram of a construction of a printing apparatus according to the eleventh embodiment of the present invention.

FIG. 21 is a block diagram of the construction of a printing apparatus according to the eleventh embodiment of the present invention. Like reference characters refer to like elements in FIG. 7.

In FIG. 21, 706B is a total using right determining unit. The total using right determining unit 706B controls an access to each font data store in accordance with the flow chart in FIG. 16 with reference to the results of the using right sign determining unit 718 and the using right number determining unit 719.

The using right sign determining unit 718 executes a logical multiplication of each using right sign of each print data processing unit and each bit map pattern producing unit, and the result is transmitted to the total using right determining unit 706B. The using right number determining unit 719 compares each using right number of each print data processing unit and each bit map pattern producing unit, and the using right number determining unit 719 transmits the result (true or false) to the total using right determining unit 706B.

As shown in FIG. 21, each print data process unit can refer to font data stores only through the using right sign determining unit 718 and the using right number determining unit 719.

The apparatus of the embodiment of FIG. 21 also operates according to the process described in the flow chart of FIG. 16 and the operation thereof will not be described in further detail.

As described above in the printing apparatus in FIG. 15, the print data processing unit 110 can refer to the font data 111 without determining by the using right sign determining unit 117 or the using right number determining unit 118. On the other hand, the print data processing unit can only refer to the font data after determining by the using right sign determining unit 718 or using right number determining unit 719 as shown in FIG. 21.

Twelfth Embodiment

Figure 22:
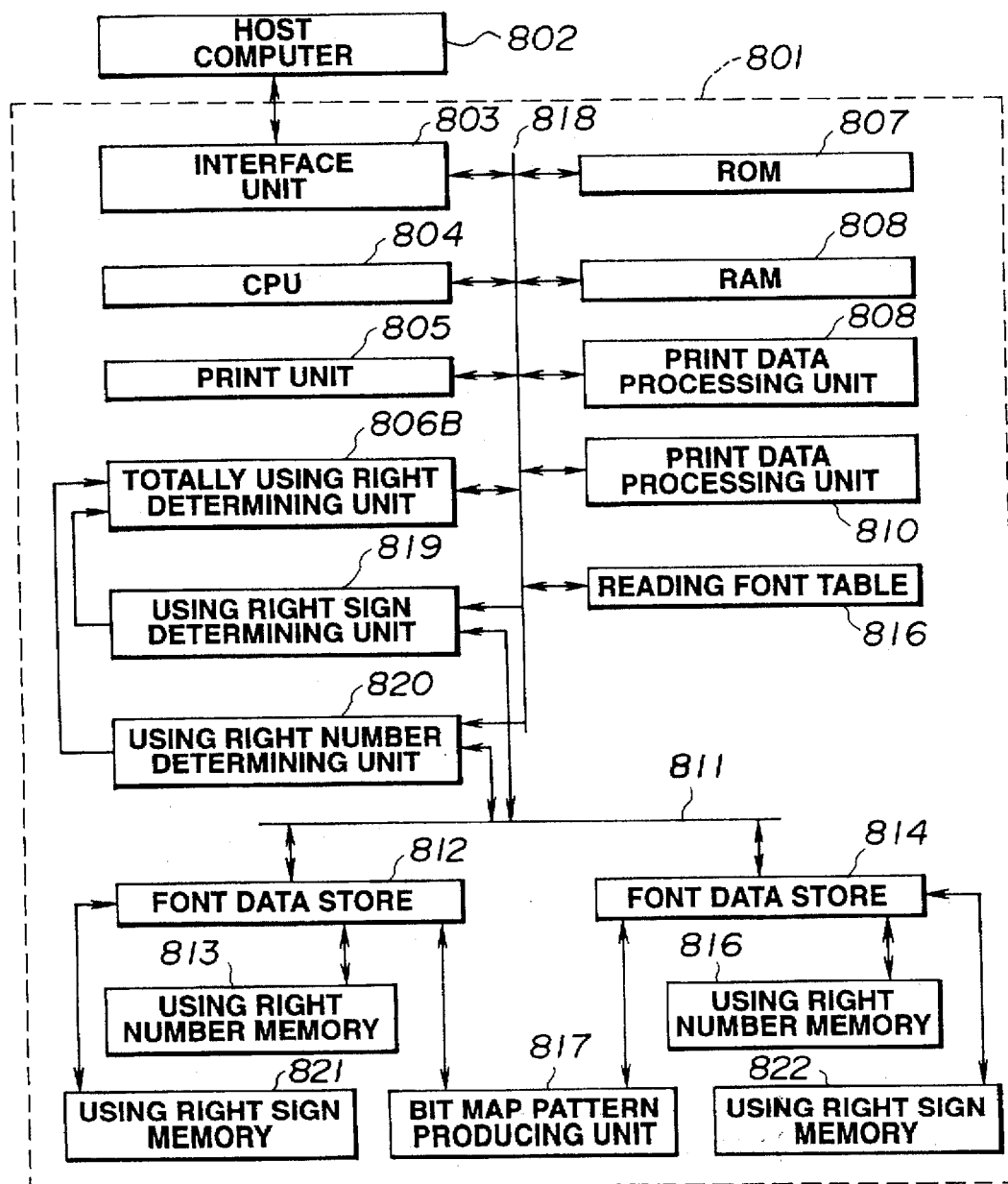
FIG. 22 is a block diagram of a construction of a printing apparatus according to the twelfth embodiment of the present invention.

FIG. 22 is a block diagram of the construction of a printing apparatus according to the twelfth embodiment of the present invention. Like reference characters refer to like elements in FIG. 8. Reference numeral 806B is a total using right determining unit. The unit 806B controls access to each font data store in accordance with the flow chart in FIG. 16 with reference to the results of the using right sign determining unit 819 and the using right number determining unit 820.

The using right sign determining unit 819 executes a logical multiplication of each using right sign of each print data processing unit and each bit map pattern producing unit, and the using right sign determining unit 819 transmits the result to the total using right determining unit 806B.

Using right number determining unit 820 compares the using right number of each print data processing unit and each bit map pattern producing unit and the result is transmitted to the total using right determining unit 806B.

As shown in FIG. 22, each print data processing unit can refer to font data store only through the using right sign determining unit 819 or the using right number determining unit 820, and the bit map pattern producing unit 817 is common to each font data store.

As described above, in the first through twelfth embodiments, the bit map pattern producing unit and the print data processing unit are provided in the printing apparatus. However, the following construction is also applicable, for example, an apparatus which can receive programs, and data from the host computer and effect bit map pattern producing functions and print data processing functions in the RAM, and after the CPU executes the processes.

Furthermore, the program and data for the bit map pattern producing unit and print data processing unit can be stored in, for example, a hard disc (HD), an optical magnetic disc (MD), CD-ROM, or a detachable memory such as a flash memory.

Thirteenth Embodiment

Figure 23:
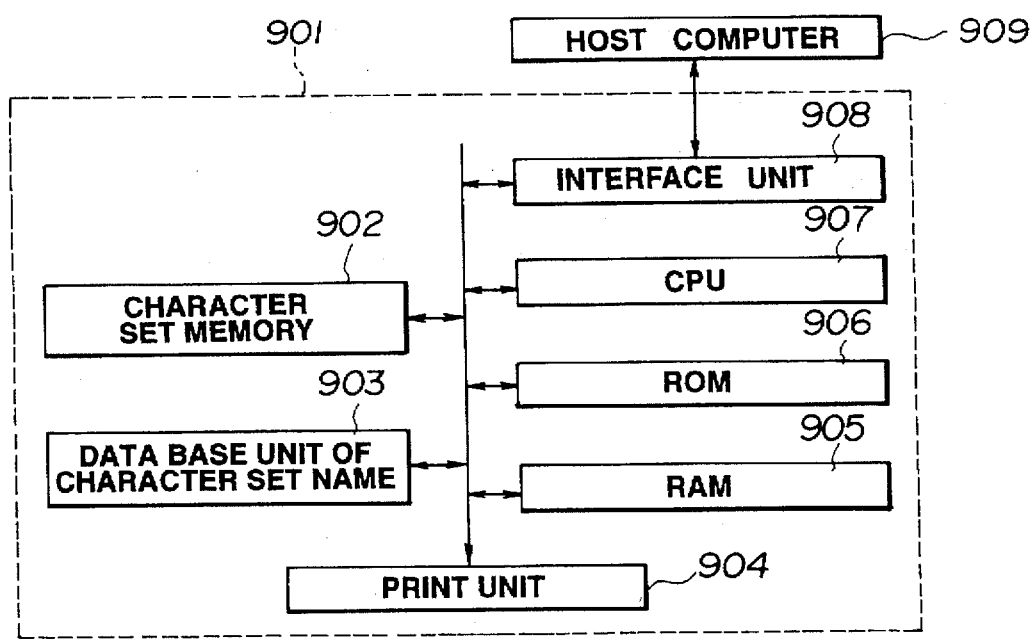
FIG. 23 is a block diagram of a construction of a printing apparatus according to the thirteenth embodiment of the present invention.

FIG. 23 is a block diagram of the construction of a printing apparatus according to the thirteenth embodiment of the present invention.

In FIG. 23, 901 generally denotes the printing apparatus, 902 is a character set memory which stores attributes or characteristics of a character pattern and a character, 903 is a data base unit which can extract an attribute of a character set from a name of a designated character set, 904 is a print unit, for example, a laser printer shown in FIG. 28 or a bubble jet type printer shown in FIG. 29, 906 is a ROM which stores a process program of a CPU 907, 905 is RAM which is a work memory for temporarily storing data in relation to the execution of processes by the CPU 907, and 908 is an interface which communicates with devices external of the apparatus, such as host computer 909, which transmits data to the printing apparatus.

In this apparatus, in case that the data base unit 903 cannot extract an attribute of a specific character set from a name of the designated character set, one of the character sets can be selected in accordance with a priority order of each attribute of each character set. Therefore, even if there is no character set in the data base unit which is equal to any character set name, the printing process uses a character which has the designated attribute.

FIG. 24 is a diagram illustrating a data structure of the character set memory 902 in FIG. 23.

FIG. 25 is a diagram illustrating one example of a name of a character set which is designated by host computer 909 in FIG. 23. In FIG. 25, 911 is the designated character.

FIG. 26 is a diagram of one example of a conversion result in the data base unit 903 of character set. In FIG. 26, 921 is an attribute of a character set and in this case, it means a modification attribute, that is to say, bold 922 is an attribute of a character set and it means a transformation attribute, that is to say, italic.

Figure 27:
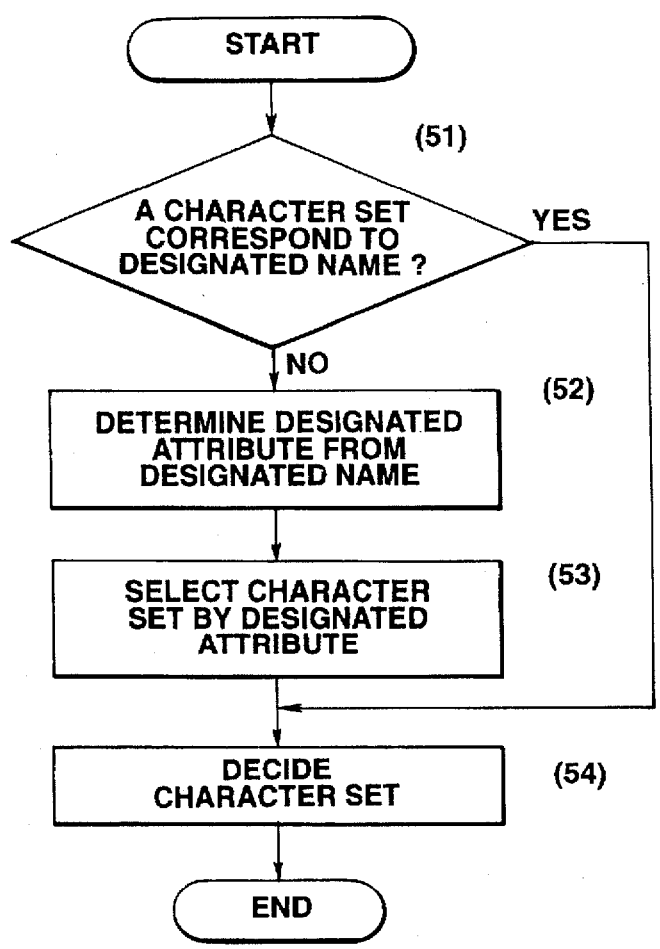
FIG. 27 is a flow chart of a process of attribute conversion of a character set.

FIG. 27 is a flow chart of a process of attribute conversion. Reference numerals (51) to (54) in FIG. 27 show each step of the process. An explanation of a case in which a designated character set name is "Courier Bold Italic" 911 will be described.

At first, the CPU 907 compares the designated name 911 and the character set name shown in FIG. 24 in step (51) of FIG. 27. If the names are identical (YES), the flow advances to step (54). In step (54), the character set to be used is decided, and the process of character selection is finished. If NO in step (51), the flow advances to step (52). In step (52), the designated name is converted to the character set attribute 921, 922 in accordance with the designated attribute by referring to the data base unit 903 for character set name. Next, the CPU searches for a character set having an attribute corresponding to the character set attribute 921, 922. In this embodiment, as shown in FIG. 24, only the stroke weight attribute in character set 2 in data base 903 corresponds to the designated attribute 921 of the designated character set. Therefore, the character set 2 is selected in step (53) and the character set to be used is decided in step (54) and process is finished.

In this embodiment, the CPU 907 only searches the character set which corresponds to the attribute of the designated character set but it is possible to prioritize a plurality of attributes to more accurately select the designated name. The priority data can be stored in the RAM 905.

In this embodiment, the contents of the data base unit 903 are fixed, but it is possible to allow the host computer 909 to transmit data to the printing apparatus for changing the contents of data base unit 903. Accordingly, the data base unit 903 can output more accurate character attributes.

As described above, in one apparatus of the first embodiment, the CPU controls allowance of an execution of the print data processing unit regarding the processing data in accordance with font indicating. Accordingly, it is possible to establish a printing environment which uses a specific print data processing unit and a specific bit map pattern producing unit.

In the second to fourth embodiments, the CPU determines a condition of set using rights by determining whether each using right corresponds to another. Accordingly, it is also possible to establish a printing environment which uses a specific print data processing unit and a specific bit map pattern producing unit.

In the fifth to eighth embodiments, the using right determining unit determines a condition of using rights being set in accordance with the result of the logical multiplication of each using right sign. Therefore, it is easy to establish a printing environment which also uses a specific print data processing unit and a specific bit map pattern producing unit.

In the ninth to twelfth embodiments, the total using right determining unit judges a condition of set using rights in accordance with the result of the logical multiplication of each using right sign and the comparing of each using right number. Therefore, it is easy to establish a high degree print data process environment which uses a special print data process unit and a special bit map producing unit.

In the thirteenth embodiment, in a case that the data base cannot extract an attribute of a specific character set from a name of a designated character set, one of the character sets can be selected in accordance with a priority order of each attribute of each character set. Therefore, even if there is no character set which is equal to any character set name, the printing process uses a character set which has the designated attribute.

With the embodiments described above, it is possible to establish a print environment which controls the print data process efficiently by using many combinations of the print data processing units and the bit map pattern producing units. Furthermore, it is possible to change an established printing environment. It is also possible to continue a print process even if there is no character set in the data base which is equal to any character set name.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An output apparatus comprising:

a plurality of processing means for processing inputted data;

a plurality of character pattern generating means for generating a character pattern in accordance with the inputted data;

first recognizing means for recognizing information on a right to use one of said plurality of processing means;

second recognizing means for recognizing information on a right to use one of said plurality of character pattern generating means;

judging means for judging whether the information on the right to use one of said plurality of processing means recognized by said first recognizing means, and the information on the right to use the one of said plurality of character pattern generating means recognized by said second recognizing means are equal; and means for allowing use of the one of said plurality of character pattern generating means by the one of said plurality of processing means when said judging means judges that equality exists, and for prohibiting use of the one of said plurality of character pattern generating means by the one of said plurality of processing means when said judging means judges that equality does not exist.

2. An output apparatus according to claim 1, wherein said second recognizing means recognizes the information on a right to use by a logical multiplication.

3. An output apparatus according to claim 1, wherein the right to use is expressed by a number.

4. An output apparatus according to claim 1, wherein the right to use is expressed by a sign.

5. An output method for setting a using right for plural data processing units to process inputted data in an output apparatus having the plural data processing units and a plurality of character pattern generating units, said method comprising the steps of:

generating a character pattern in accordance with the inputted data;

recognizing information on a right to use one of the plural data processing units;

recognizing information on a right to use one of the plurality of character pattern generating units;

judging whether the information on the right to use the one of the plural data processing units and the information on the right to use the one of the plurality of character pattern generating units are equal; and allowing use of the one of the plurality of character pattern generating units by the one of the plural data processing units when equality is found in said judging step and for prohibiting use of the one of the plurality of character pattern generating units by the one of the plural data processing units when equality is not found in said judging step.

6. An output method according to claim 5, wherein, in said step of recognizing information on a right to use one of the plurality of character pattern generating units, the output apparatus recognizes the information on a right to use by a logical multiplication.

7. An output method according to claim 5, wherein the right to use is expressed by a number.

8. An output method according to claim 5, wherein the right to use is expressed by a sign.

9. A recording apparatus comprising:

a memory holding a plurality of character sets;

a plurality of data processing units for processing inputted data;

a plurality of character pattern generating units for generating a character pattern in accordance with the inputted data;

a first recognition unit for recognizing information on a right to use one of the plurality of data processing units;

a second recognition unit for recognizing information on a right to use one of the plurality of character pattern generating units;

a judgment unit for judging whether the information on the right to use the one of said plurality of data processing units recognized by the first recognition unit, and information on the right to use the one of said plurality of character pattern generating units recognized by said second recognition unit are equal; and a device for allowing use of the one of said plurality of character pattern generating units by the one of said plurality of data processing units when the judgment unit judges that equality exists, and for prohibiting use of the one of said plurality of character pattern generating units by the one of said plurality of data processing units when the judgment unit judges that equality does not exist.

10. An output apparatus according to claim 9, wherein said second recognition unit recognizes the information on the right to use by a logical multiplication.

11. An output apparatus according to claim 9, wherein the right to use is expressed by a number.

12. An output apparatus according to claim 9, wherein the right to use is expressed by a sign.

13. An output apparatus comprising:

a memory holding a plurality of character sets;

a plurality of data processing units for processing inputted data;

a plurality of character pattern generating units for generating a character pattern in accordance with the inputted data;

a first recognition unit for recognizing information on a right to use one of said plurality of processing means;

a second recognition unit for recognizing information on a right to use one of said plurality of character pattern generating means;

a search unit for searching for a character set in accordance with a designated name of a character set, said search unit searching for the character set corresponding to the designated name by using prioritized attributes or characteristics of the character set; and a setting device for setting one of allowance and prohibition of processing by said plurality of data processing units in accordance with a search result of said search unit.

* * * * *

UNITED STATES PATENT AND TRADEMARK OFFICE
CERTIFICATE OF CORRECTION

PATENT NO. : 5,742,744
DATED : April 21, 1998
INVENTOR(S) : Migishima

It is certified that error appears in the above-identified patent and that said Letters Patent is hereby corrected as shown below:

COLUMN 2:

Line 25, "devices" should read --device--.

COLUMN 6:

Line 51, "111i" should read --111)--.

COLUMN 14:

Line 29, "controlling" should read --controls--.

Signed and Sealed this

Twenty-ninth Day of September, 1998

Attest:

BRUCE LEHMAN

Attesting Officer

Commissioner of Patents and Trademarks